(12) United States Patent
Holdo Baggott

(10) Patent No.: US 8,936,017 B2
(45) Date of Patent: Jan. 20, 2015

(54) COOKING APPARATUS WITH DOWNWARD OPENING LID

(76) Inventor: Max Alejandro Holdo Baggott, Bethesda, MD (US)

( * ) Notice: Subject to any disclaimer, the term of this patent is extended or adjusted under 35 U.S.C. 154(b) by 200 days.

(21) Appl. No.: 13/466,537

(22) Filed: May 8, 2012

(65) Prior Publication Data

US 2012/0288596 A1 Nov. 15, 2012

Related U.S. Application Data

(60) Provisional application No. 61/484,026, filed on May 9, 2011.

(51) Int. Cl.
*A47J 37/07* (2006.01)
*A23L 1/01* (2006.01)

(52) U.S. Cl.
CPC ........... *A23L 1/0128* (2013.01); *A47J 37/0704* (2013.01)
USPC ........ 126/25 R; 126/25 A; 126/332; 126/338; 126/190; 219/433; 426/523; 99/333; 99/348

(58) Field of Classification Search
CPC ....................................................... A47J 37/07
USPC .............. 126/25 R, 25 AA, 332, 9 R; 29/428; 426/235, 523; 219/433
See application file for complete search history.

(56) References Cited

U.S. PATENT DOCUMENTS

| | | | |
|---|---|---|---|
| 2,478,253 A * | 8/1949 | Doner | 219/404 |
| 2,895,405 A * | 7/1959 | Hopkins | 99/341 |
| 3,358,587 A * | 12/1967 | Hunt et al. | 99/421 H |
| 3,429,629 A * | 2/1969 | Paolo | 312/9.9 |
| 3,692,012 A * | 9/1972 | Wiggins | 126/25 R |
| 3,757,675 A * | 9/1973 | Wilbricht | 99/446 |
| 4,304,177 A * | 12/1981 | Loeffler et al. | 99/333 |
| 4,390,002 A * | 6/1983 | Daily, III | 126/25 R |
| 4,462,306 A | 7/1984 | Eisendrath | |
| 5,421,318 A | 6/1995 | Unruh | |
| 5,660,101 A | 8/1997 | Cirigliano | |
| 5,809,988 A | 9/1998 | Wagner | |
| 5,839,356 A * | 11/1998 | Dornbush et al. | 99/331 |
| 5,865,099 A * | 2/1999 | Waugh | 99/340 |
| 6,260,694 B1 * | 7/2001 | Sasahara | 198/860.4 |
| 6,557,544 B2 | 5/2003 | Sim | |
| 7,856,924 B1 | 12/2010 | Stihi | |
| 7,878,186 B2 | 2/2011 | Cusack | |
| 2007/0283945 A1 * | 12/2007 | Gabrielle | 126/25 AA |
| 2008/0256863 A1 * | 10/2008 | Zitko | 49/41 |
| 2010/0206287 A1 | 8/2010 | McElmore | |
| 2011/0283889 A1 | 11/2011 | Con | |
| 2013/0239944 A1 * | 9/2013 | Woods et al. | 126/190 |

* cited by examiner

*Primary Examiner* — Steven B McAllister
*Assistant Examiner* — Nikhil Mashruwala

(57) ABSTRACT

Provided is a cooking/grilling apparatus, primarily for outdoor use, providing smoking and/or direct or indirect heat cooking capability, and offering the user enhanced cooking flexibility, temperature control, safety and convenience of operation. The grill apparatus is unique in that it offers a downward opening lid that rotates, such as on rollers or a pivot mechanism, to a fully open position beneath the base plate of the cooking enclosure, and reverses to an upward rotation to re-close the cooking enclosure. Moreover, the grill apparatus offers a vertically adjustable cooking grate, controlled by a continuous loop cable, moving over a set of pulleys, thereby reliably controlling the height of the cooking grate when affixed to a crank on the outer surface of the grill, wherein movement of the grate can also be locked in place.

3 Claims, 14 Drawing Sheets

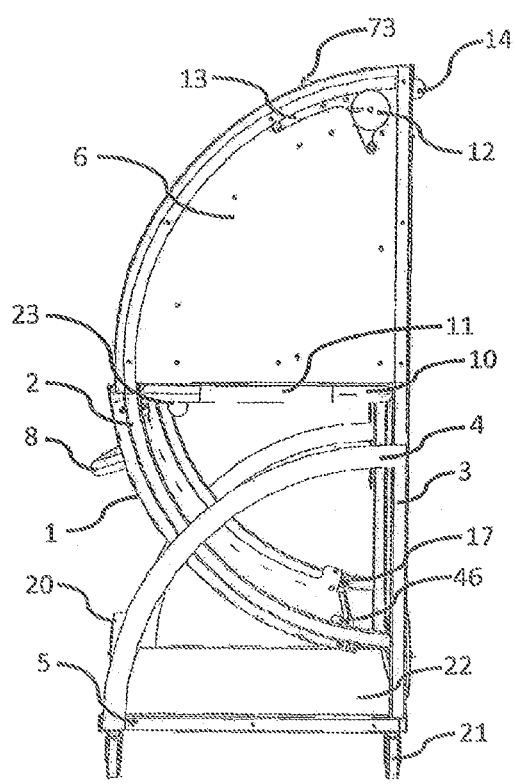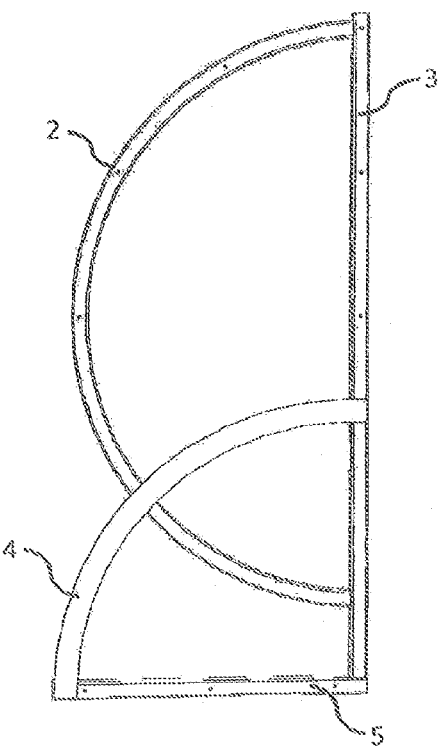
FIGURE 5
FIGURE 6

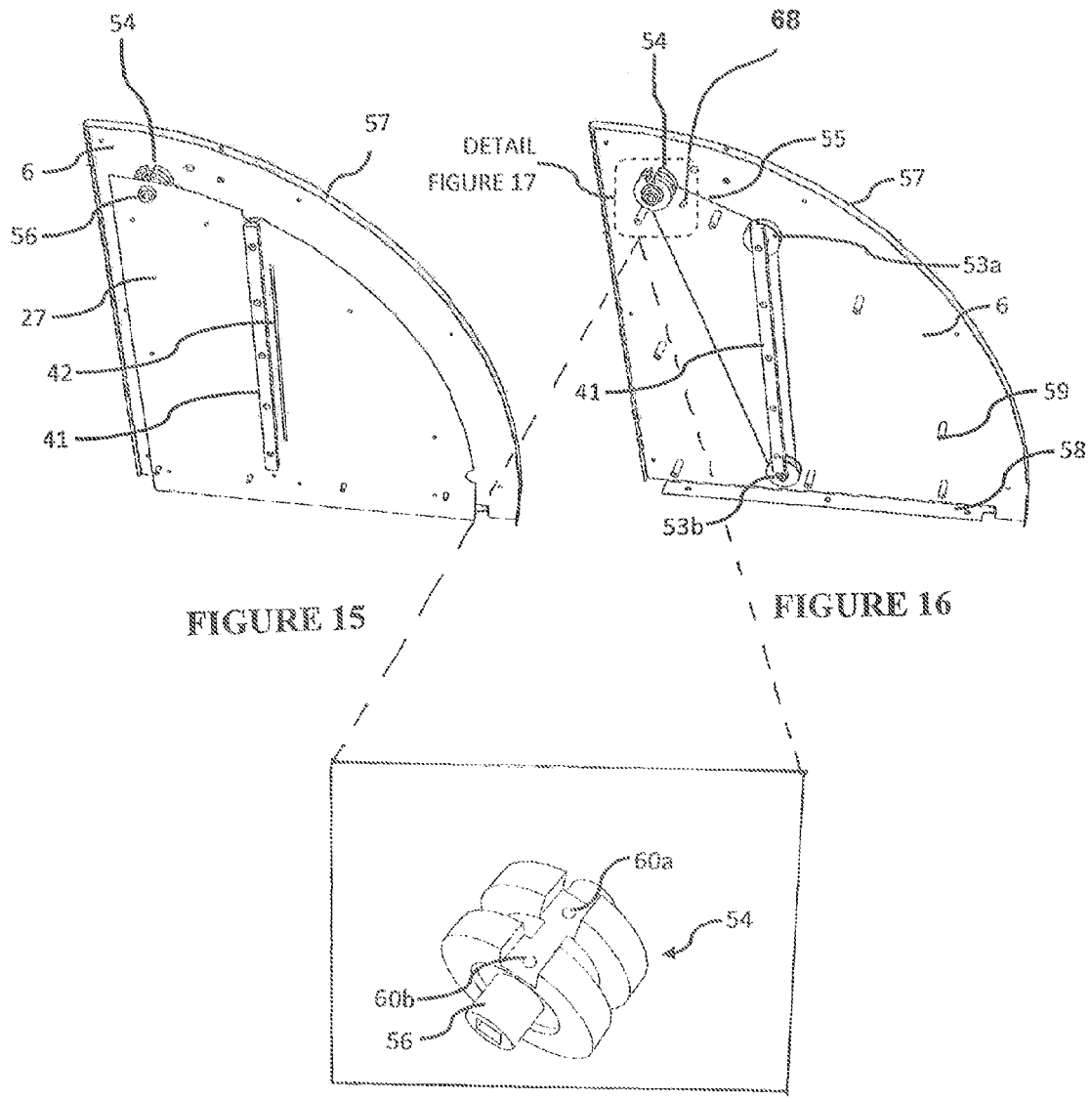

ated height cooking grate, as opposed to an adjustable height fire grate, while simultaneously providing a downward opening lid, and a separate firebox for smoking and preparing the fire.

COOKING APPARATUS WITH DOWNWARD OPENING LID

CROSS-REFERENCE TO RELATED APPLICATIONS

This application claims priority to U.S. Provisional Application 61/484,026 filed on May 9, 2011, which is incorporated herein in its entirety.

FIELD OF THE INVENTION

The invention relates to improvements to cooking grills, in particular providing a downward opening lid and a continuous loop cable to the vertical movement of the cooking grate that holds the food being smoked, or cooked directly or indirectly in the grill apparatus. The grill of the present invention and methods relating thereto are preferably used outdoors, utilizing wood, charcoal and/or other combustible fuels that burn to embers, thereby providing enhanced cooking flexibility, safety, convenience and efficiency to users of the cooking apparatus.

BACKGROUND OF THE INVENTION

Prior art outdoor cooking apparatus (also generally known as "grills" and/or outdoor grills and/or barbecue grills) are known that (a) control temperature by adjusting the height of the cooking grate over the burning coals; (b) use a lid as a means to cook food in an enclosed environment; (c) have a firebox for smoking and/or preparing the fire; (d) have open fronts to easily access the embers, add charcoal or wood, and tend to the food being cooked or smoked.

Grill lids are typically hinged to the rear of the cooking enclosure and open upwards, meaning that to lift the lid of the grill, including a hot grill, the user must move his/her arm(s) over the cooking enclosure when moving the lid from a closed to an open position or in the reverse to close the grill. As a result, particularly when the user opens the lid of such grills during the cooking process, the user must stand directly in front of the heat source and when the lid is lifted up and across the heat source, he/she is exposed to a sudden release of intense heat and/or flare-ups that can cause burns and injury. Moreover, the user continues to be exposed to intense heat and flare-ups as his/her arm moves over the heat source while continuing to open the lid to the open position. Risk of injury to the user is also problematic whenever a lid is closed that requires reaching over the heat.

Furthermore, lids that typically "hang" over the cooking surface cause an additional risk when the hot grill is open, because the lid may unintentionally fall, causing possible injury.

In addition, grills with open front access to the charcoal and adjustable height cooking grates are difficult to cover with a traditional "upwards opening" lid because of the additional surface area required to cover both the front and top of the cooking enclosure. As a result, it is difficult to design a lid that is not too large or cumbersome to accommodate a moving cooking grate structure, and it necessitates a very large lid hanging over the grill while in the open position.

In the prior art, grills that control temperature by using a mechanism that adjusts the height of the "cooking grate" include U.S. Pat. No. 4,462,306. However, mechanism of this type include a rod that holds the cooking grate structure, and runs across the center of the cooking grate, thereby getting in the way of the food and handling the food when the cooking grate is high above the coals and close to the rod. Grills in the prior art that have "adjustable height cooking grates," as opposed to "adjustable height fire grates," often have such inherent design problems.

While U.S. Pat. No. 3,358,587 focuses on a means to cook food in a vertical position, so that dripping from the food will not fall on the charcoal or flames, hence reducing the amount of smoke and flare-ups, it also describes a means by which the firebox can be moved closer or farther from the food to regulate the temperature. U.S. Pat. No. 5,421,318 provides a grill in which the cooking enclosure is completely enclosed with access to the fire through a front door, but there is no separate firebox for indirect cooking, or for preparing the fire on the side. As described above, the lid opens upwards, and although the cooking grate is adjustable in height by means of a crank, the cooking grate appears to hang from cables that rely upon gravity and offers no endless loop action that can apply downward force. Moreover, by providing four points of contact in each corner of the cooking grate, additional stability is provided, but it requires two support shafts, including one at front which will get in the way of handling the food. Moreover, while this '587 and '318 grills do show a lid, there is no suggestion that the lid may be moved down and back.

U.S. Pat. No. 5,660,101 offers a means to rotate food 180 degrees to expose both sides of the food to heat and facilitate cooking by means of an elaborate mechanism of sprockets and chains that allow the user to rotate the food basket by turning a crank. Neither a lid nor a separate firebox is suggested as a claimed element of the invention.

U.S. Pat. No. 5,809,988 discloses an enclosed grill with a front door for access to the combustible material. A lid and a crank operated mechanism that enables the vertical height adjustment of the combustible material to control the cooking temperature, but it fails to provide a means for adjusting the height of the cooking grate height, as opposed to adjusting the fire grate height.

U.S. Pat. No. 6,557,544 provides an open grill without a lid that offers a means of lighting the charcoal with gas, and has an adjustment mechanism to change the height of the cooking grate to provide temperature control. Similarly, U.S. Pat. No. 7,856,924 provides an open fire grill with a means for adjusting the height of the fire grate to control the temperature while using a rotisserie type mechanism to cook the food, although a non-lid means is described to partially cover the food from above with a hood that reflects the heat.

Finally, U.S. Pat. No. 7,878,186 provides a grill having a lid that can be opened upwards in various positions, and further provides a crank adjustable height cooking grate to permit both indirect and direct heat cooking. Although offering improvements to the prior art, the '186 patent fails to include an improved firebox. Published Appl. US2010/0206287 describes an enclosed combined grill/smoker with an offset firebox for smoking, and a lid that opens upwards as appear in traditional grills, and a means of adjusting the fire grate height to control the temperature. In addition, Published Appl. US 2011/0283889 describes an open grill with a means for adjusting the height of the cooking grate to control the temperature, although there is no reference to the lid or the firebox to combine direct heat grilling and smoking.

As a result, in light of the foregoing, it is clear that there is an unmet need in the art that has not been met. Prior art grills lack lids that open in a downward direction, enabling open-front access to the charcoal, wood, and/or other combustible fuels, while protecting the user from blasts of heat when opening the heated grill to access the food or the firebox in motions that require the user to dangerously reach across the heat source. Nor does the prior art currently provide an adjustable height cooking grate in a grill, using a continuous loop cable system to provide reliable, adjustable vertical movement.

BRIEF SUMMARY OF THE INVENTION

The present invention provides a cooking/grilling apparatus, primarily for outdoor use, providing either smoking and/or direct heat cooking opportunities, and offering the user enhanced cooking flexibility, temperature control, safety and convenience of operation. The grill apparatus of the invention is unique in that it offers a downward opening curved lid that moves under the cooking enclosure, rather than above and/or behind the cooking enclosure as in the prior art. The downward opening lid is not known to be a concept used on other grills.

This objective is achieved by the downward motion of the curved or shaped lid to open the cooking enclosure, wherein the downward rotation of the lid follows around the circumference of the curvilinear plane of an axis of rotation around the base plate of the grill frame. The center of curvature of the arcuate lid is perpendicular to a linear plane extending laterally for the horizontal length of the grill from a center point on the base plate near where it functionally meets with the back panel of the grill. The curved or shaped lid operates on sets of rollers straddling a track formed on either side of the grill by a pair of curved frame support members, wherein the curved frame support member repeats ("duplicates") the same axis of rotation as the curved lid or a bent shape ≥90° which if circumscribed with a generally curved shape would average into the same curve, therefore the term "curved" refers to both curved and angled lids acting in the same manner, permitting and providing downward motion of the lid from its closed position. Thus the invention encompasses any shape lid rotating downward around a curved arc in the manner disclosed herein.

The lid may be partially- or fully-opened, but to reach the fully-opened position, the downward rotation of the lid follows its axis of rotation along the track of the curved support member, with the leading edge of the lid continuing its motion under the base plate of the grill until stopped by end-points ("stops" or "bumpers") near the joint of the track of the curved support member with the rear vertical frame support member. Thus, the rotation of the lid downward completes a generally hemi-circumference of the partial barrel- or cylinder-shaped grill apparatus. The downward motion of the curved lid is manually reversible back upward to partially- or fully-close the cooking enclosure and/or firebox and return the lid to the fully-closed/start position.

As a result, downward movement to open the lid (and of course the reverse upward movement to reclose the lid) translates into rotation of the lid about its axis of rotation. Prior art grills typically have lids that move upward over the cooking enclosure and/or firebox as the lid is opened, exposing a user to significant risk of being burned. In marked contrast, embodiments of the current invention provide a lid that opens downward, then moving backward under the cooking enclosure by rolling over the curved tracks that are part of the structural frame of the grill. The user of the present invention never needs to reach across the hot grill to move the lid, and the lid never moves behind the grill consuming valuable space between the grill and a wall behind it.

The current invention further provides a unique cooking enclosure that is shaped as a quarter barrel, with the arcuate or bent shaped lid, which is unique in that it opens downward as disclosed. The general curvilinear shape of the grill when viewed from the end is essentially half of a barrel shape, flat in the back, creating a hemi-circumference of the cylindrical shape. This shape is more than merely aesthetic; this improvement has significant functional attributes because it enables the safe use of a downward moving curved lid that covers both the top and the front of the cooking enclosure, providing the user with an open front and full access to the combustible fuel and food when the lid is open for direct-heat cooking, while also providing the user with means to cook with the lid closed, such as when smoking or using other forms of indirect-heat cooking that requires a closed cooking enclosure.

While the downward opening lid of the present invention encompasses grills having fixed or moveable cooking grates, it is a further objective of the grill apparatus to provide a vertically adjustable cooking grate, supported by a frame, wherein movement is controlled by a continuous loop cable moving over a set of pulleys, thereby reliably controlling the position of the cooking grate when an affixed rotary crank is turned, and wherein the cooking grate can be locked in place. The vertically adjustable cooking grate is embodied herein in a grill having a downward opening lid, but in other embodiments of the invention, the vertically adjustable cooking grate is advantageously used in any grill, regardless of the motion of the lid, and it need not be so limited.

Embodiments of the grill(s) of the present invention provide a mechanism used to lower and raise the cooking grate, thereby eliminating the need for a rod running over the middle of the cooking grate to hold the cooking grate structure. In contrast to prior art, embodiments of the invention provides a system of pulleys and capstans that are interconnected via steel cables and a rod. Because grills contains one or more functional "grates," the "cooking grate," as referred to herein and as commonly understood in the art, means the grate in the grill that supports the food being cooked; whereas the "fire grate" refers to the grate within the grill that supports charcoal, wood or other combustible fuel used to create the heat used to cook the food. The cooking grate in the present invention is supported by a frame held by two cables on each side of the cooking grate. The cable on each side of the cooking grate loops around a lower pulley and an upper pulley that are placed close to the center of the cooking grate.

In certain embodiments of the present invention, a specifically designed firebox is part of the enclosure, adjacent to and at the same level as the cooking area, with a partition separating the two. The firebox has two primary functions: one of them is to burn combustible fuel, preferably charcoal and/or wood, down to a residue of embers (including hot coals) so that the embers are available for cooking as needed; the other is to provide smoker capability from the smoke produced in the firebox. The term "combustible fuel" as used herein refers to charcoal, "wood" (including all types of combustible wood or wood solids, in any form that will fit into the grill, such as smoking woods or pellets), and/or gas (including propane, butane, liquid petroleum (LP), natural gas or the like, either as a contained fuel or as a direct connection to a fuel line), or other combustible fuels, although the invention is not intended to be limited to the listed combustible materials. For example, combined fuels, such as wood and/or charcoal with a gas or electric starter or booster, are encompassed by this invention. Moreover, electric heat, although not truly combustible, is intended to be encompassed as a fuel within the term "combustible fuel." In certain embodiments of the invention, the firebox has double walls (i.e., both outside and inside steel panels with spacing in between) to protect the outer steel frame from the heat of the fire, although not every embodiment is so limited. Thus, the firebox is further adaptable to support additional cooking grates, that are either adjustable in height, or simply have different levels of support.

Embodiments of the invention provide a unique cooking enclosure that is designed for the first time to be used with both a fire grate for charcoal, wood or other fuels, and/or with refractory bricks of the type typically used in Argentine type grills, and/or with a removable ash pan. The combined use of both a fire grate and firebricks in the cooking enclosure offer the advantage of providing airflow to the combustible fuel from below, while still retaining the advantages offered by the firebricks. Thus, the current invention advantageously offers an open front to facilitate access to the combustible (meaning flammable) fuel and for removing the ash, as well as convenient access to the cooking surface and food thereon. Moreover, the optional use of refractory bricks is also extremely useful when using wood and/or charcoal fuel. The use of closely placed refractory or firebricks as a means of fuel support is also useful because it protects the steel panels from the intense heat of the fire, particularly high when wood is used as fuel. In addition, such refractory or firebricks retain heat for longer and are particularly useful if smoking is done over extended periods of time at relatively low cooking temperatures.

Additional objects, advantages and novel features of the invention will be set forth in part in the description, examples and figures which follow, all of which are intended to be for illustrative purposes only, and not intended in any way to limit the invention, and in part will become apparent to those skilled in the art on examination of the following, or may be learned by practice of the invention.

BRIEF DESCRIPTION OF THE FIGURES

The foregoing summary, as well as the following detailed description of the invention, will be better understood when read in conjunction with the appended drawings. Components which are essentially the same are given the same reference numbers through-out the drawings. It should be understood, however, that the invention is not limited to the precise arrangements and instrumentalities shown.

FIG. 5 shows a side view of the grill having a roll-down lid with the lid open.

FIG. 6 shows a side view of the right side tubular frame structure of the grill having a roll-down lid.

FIG. 15 shows an inside view of the right side outer panel and of the right side inner panel that protects the adjustable height cooking grate mechanism from the heat.

FIG. 16 shows the same view as FIG. 15 but has the inner panel suppressed, exposing the right side adjustable height cooking grate mechanism.

FIG. 17 shows a close-up view of the capstan visible in FIG. 16.

DETAILED DESCRIPTION OF EXEMPLARY EMBODIMENTS OF THE INVENTION

Figure 1:
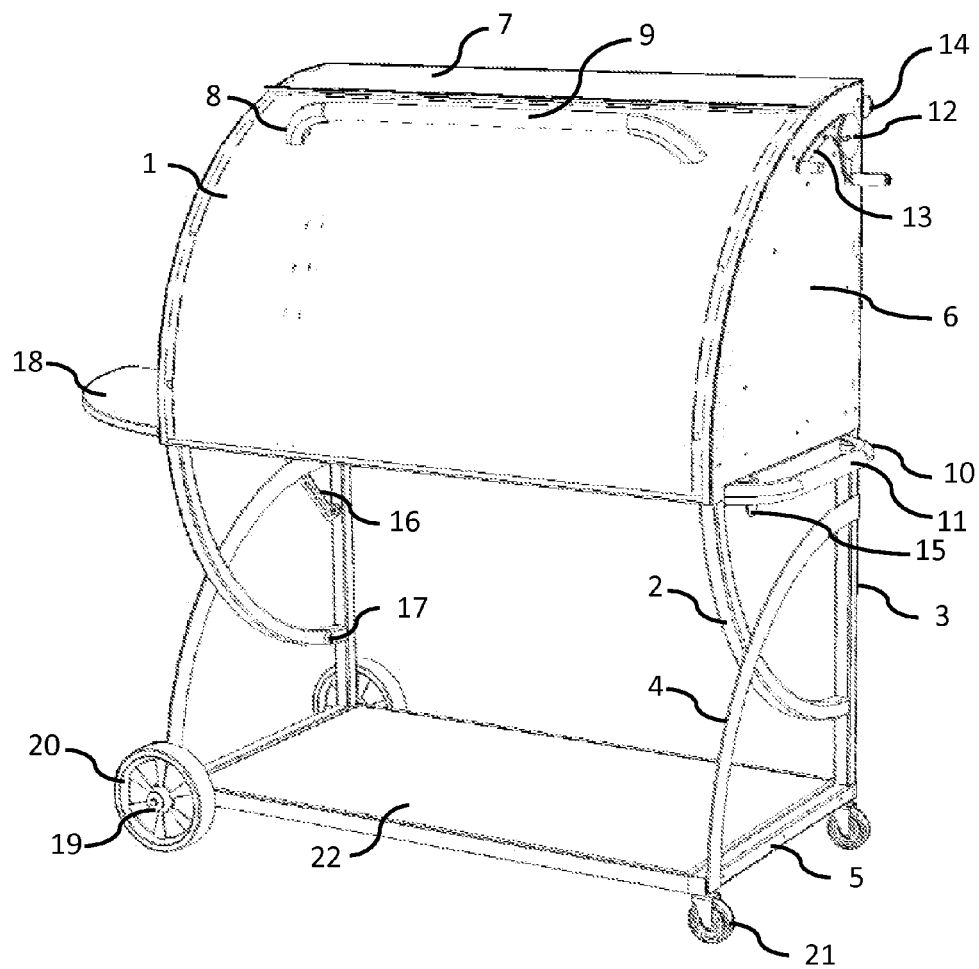
FIG. 1 shows a front perspective view of the grill having a roll-down lid with the lid closed.

Although the Figures will be described in greater detail, an overview is first provided to explain the numerous elements that make the present invention unique. The prior art offers no known grill having a lid that moves downward and rotates under the cooking enclosure when the heated grill is opened. Such grills typically have lids that open upward over the cooking enclosure as the lid is opened, exposing the user to significant risk of being burned. In marked contrast, embodiments of the current invention provide a lid that opens downward, moving under the cooking enclosure by rolling over bent curved tubes (tracks) that are part of the structural frame of the grill, making it a "roll-down lid." Other mechanical operations achieve the same result, such provided in an alternative embodiment, disclosed below, in which a pivot mechanism establishes the downward rotation, replacing the "roll-down" mechanism, but still applies the same principle, allowing the lid to rotate to a position resting under the cooking enclosure.

This improvement has a number of useful functions. (a) It eliminates the need for a huge lid hanging over the cooking enclosure with safety concerns due to the chance that it could fall and cause injury to the user. (b) In an open front grill design, the disclosed lid feature is all the more useful as the size of the lid is necessarily larger than in grills with fuel pits. (c) Also in an open front design, having the lid open downward under the cooking enclosure creates a pit-type environment by having the lid in a semi-open position, reducing the safety concerns of hot embers rolling out of the front of the grill. (d) The downward opening lid, moving under the cooking enclosure enables the grill to be placed up against a wall without the need to leave room for an open lid to lean backwards. (e) The downward opening lid, moving under the cooking enclosure also facilitates the use of mechanisms, such as a crank to open and close the lid, and as a result the user does not even have to touch the lid, which would normally be too hot for manual contact once the grill has been heated.

The current invention has a unique cooking enclosure that when viewed horizontally from either end, is shaped as a quarter barrel, essentially flat on the back and the bottom and arcuate at the outer circumference of the quarter round shape. As indicated, this shape is not merely aesthetic; it has functional attributes because it enables the use of a downward moving curved lid that covers both the top and the front of the cooking enclosure. In one embodiment, the arcuate shape of the track over which the lid rolls functions as both a support frame for the cooking enclosure, and as a means over which the lid slides into an open or closed position, and has the advantage of facilitating the use of a lid that opens downward and under the cooking enclosure. In an alternative embodiment, the curved lid pivots to open grill in the downward mode, but consistently in each embodiment, there is no need to have vertical legs to support the front of the cooking enclosure, which would otherwise obstruct the opening of the lid.

In a first disclosed embodiment of the grill apparatus characterized by its downward moving lid design, each of the four corners of the lid has a metal attachment with two rolling elements, one upper roller and one lower roller. The positioning of the sets of rolling elements at the four contact points of the lid to the grill frame enable the lid to open downward and close by rolling over two curved, bent tubes forming "tracks" for the rollers on each side of the lid, holding the roll-down lid in place and providing curvilinear movement of the lid. The curved tubes have notches, placed along the cooking enclosure to lock the lid in place in closed or semi-closed positions. In a second disclosed embodiment of the downward moving lid design of the grill apparatus applies a pivoting action, but the lid still rotates downward to open the cooking enclosure. Embodiments are provided in the current invention, wherein the exemplified lid is manually operated, or in the alternative, modifications are disclosed whereby the design is adapted to operate the lid via a lever, crank or other mechanism so that the user need not actually touch the hot lid. Details of the downward moveable lid are provided below.

Further embodiments of the grills of the present invention, preferably used in combination with the downward opening lid feature, provide a mechanism used to lower and raise the cooking grate, thus eliminating the need for a rod running over the middle of the cooking grate to hold the cooking grate structure. In contrast, embodiments of the invention provide a system of pulleys and capstans that are interconnected via steel cables and a rod. The cooking grate is supported by two cables on each side of the cooking grate. The cable on each side of the cooking grate loops in a continuous loop, around a lower pulley and an upper pulley that are placed close to the center of the cooking grate. In one embodiment, the two extremes of the cable loop attach to capstans that are placed in the upper back corners of the cooking enclosure. A rod connects the two capstans on each side of the cooking grate; one at the inside of the outer frame of the grill; the other one positioned in a space between a preferably double walled partition between the opposite side of the cooking enclosure and the firebox, when a firebox is present in the grill apparatus. A crank handle connects to the rod, and when the handle is operated, it rotates the rod, such that the cables on each side of the cooking grate wind around the capstan at one extreme of the cable loop and unwind from the capstan at the other extreme of the cable loop. The cables on either side of the cooking grate move simultaneously in a vertical direction, lowering and raising the attached frame for the cooking grate frame, while the rod is placed at the rear of the cooking enclosure, thereby not interfering with large food items placed on the center of the grill. This arrangement permits the user to reach food items placed at the rear of the heated cooking grate without interference from a hot rod in front of the grate. Certain embodiments provide multiple cooking grates in the grill, wherein at least one is controlled by the continuous loop system.

In addition, a specifically designed firebox is embodied in the cooking enclosure, adjacent to and at the same level as the cooking area, with a partition separating the two. The firebox has two primary functions: one is to have embers ready for cooking at all times; the other is to provide smoker capability. In the first case, a firebox is particularly useful when using wood, as many grilling techniques, require the wood, charcoal, etc, to be burned down into embers before it is ready to use for cooking purposes. The embers can then be easily transferred by shovel into the main cooking enclosure. The open front of both the firebox and the cooking enclosure when the lid of the present invention is opened, enables easy access to the embers or hot coals, and facilitates the transfer of such embers or hot coals from the firebox to the cooking enclosure.

In addition, the lower half of the partition has one or more, preferably two circular openings that allow smoke to pass through to the main cooking enclosure to allow for smoking, although the invention encompasses opening(s) of any shape, not just circular, that allows smoke to flow from the fire enclosure to the main cooking enclosure and allows for smoking of the food. Moreover, the firebox has double walls (i.e., both outside and inside fire resistant metal, such as steel, panels with spacing in between) to protect the outer steel frame from the heat of the fire, although the invention is not so limited and certain embodiments utilize single walls. The firebox is further adaptable to support additional cooking grates, that are either adjustable in height with a crank or simply have different levels of support.

As shown, for example in FIG. 2, and as explained in greater detail below, the firebox is, therefore, simply an area that is used to make a fire of charcoal or wood. Food is not actually cooked in the firebox, although it could be possible to have an optional cooking grate in that area as well to add cooking surface area if needed. As indicated, the firebox serves two different primary functions, for smoking, the fire is made in the firebox, and with the lid closed, the resulting heat and smoke migrates through the holes in the partition to cook the food slowly; whereas when used as a grill for direct heat grilling, the wood, charcoal or other fire in the firebox provides a constant source of embers ready to place under the food in the main cooking enclosure, for example using a small shovel. The advantage of such a unique firebox is that one can cook for longer periods of time, and have better temperature control, because the fuel is added to the firebox without interfering with the cooking part of the grill. Moreover, in the case of using wood as a fuel, the firebox is especially useful to first burn down the wood into embers, so that only embers or hot coals are used under the food on the cooking grate, as opposed to trying to cook with flaming wood, whereby heat is difficult to control and the food can be burned by the flames, potentially creating carcinogens and a burnt taste. Wood and charcoal may be burned together, and may be further supplemented by combustible gas, but if the lid of the grill is to be closed, the combustible fuel must be of a size that fits within the firebox or within the grill.

Nevertheless, the grill is not limited to only the disclosed firebox design. In fact, although less efficient and missing some of the advantages of the firebox capability, one embodiment of the grill provides no firebox within the grill, and instead the wood or charcoal fire or other combustible fuel is simple prepared in the cooking enclosure, in a manner typical of many prior art grills. Propane, butane, acetylene, ethane, silane, liquid petroleum (LP) and/or natural flammable gas, or even electric heat, could thus be applied if nontoxic. If the firebox and partition separating the firebox from the cooking enclosure are removed, there is significantly more space available for the cooking grate, but the remaining features of the grill assembly still make it unique in the art.

Many American grills in the prior art that have the firebox on the side as a separate enclosure are usually used exclusively for smoking. They are not meant to be used as a means to maintain a source of embers, nor to be used for preparing a wood fire, as it is very difficult and impractical to transfer the embers over to the main enclosure if the embers are in a pit, as found in prior art grills. As a result, the open front design made possible by the unique operation of the lid and the preferred base of fire bricks in the grill makes it easy to scoop out and transfer the embers to beneath the cooking grate in the cooking enclosure using a shovel, thus offering significant advantages over the prior art by combining Argentine style direct heat grilling with American style smoking.

Furthermore, a unique cooking enclosure is provided that is designed for the first time to be used with either a fire grate for charcoal, wood, or other fuels, and/or with refractory bricks typically used in Argentine type grills. A flat horizontal base panel ("base plate") is made to measure in the present invention to permit a tight fit of standard sized refractory bricks placed thereon. In the alternative, the fire grate can be easily removed to accommodate the bricks. Moreover, when bricks are used as a fuel support, an ash tray cannot be used because the ash forms directly on the bricks, therefore the ash has to be removed, such as with a shovel or rake. As a result, the current invention advantageously offers an open front made possible by the lid design to facilitate removing the ash, since the process would be extremely cumbersome if the bricks were resting inside a pit-type enclosure.

The optional use of refractory bricks is also extremely useful when using wood as a fuel. With bricks placed at the base of the firebox, a log holder can be placed inside the firebox. For example, wood is placed in the log holder and burned down to embers, which fall under the log holder onto the bricks, and are then collected with a shovel and transferred to the main cooking enclosure. The problem with using a fire grate when using wood as fuel is that many of the wood embers are often small enough to fall between the rods that make up the grate. As a result, many of the embers are wasted as they fall through to the ash pan in the firebox. The use of firebricks as a means of support of the fuel is also useful because it protects the fire resistant metal (steel) panels from the intense heat of the fire, which is particularly intense if wood is used as fuel. In addition, firebricks retain heat for longer and are particularly useful if smoking is done over extended periods of time at relatively low cooking temperatures.

The grill, as presently exemplified in the Figures, is depicted as approximately 44 inches wide, 23 inches deep and 55 inches tall. However, this same design could be applied in grills of different dimensions, ranging from at least 10 to 44 or 44 to 80 inches wide, 10 to 23 or 23 to 35 inches deep, and 40 to 55 or 55 to 70 inches tall. The sizes may be larger or smaller, so long as the grill meets the functions stated herein and is of a size and height that is comfortable for the user. The width in particular is adaptable to any size that is sufficient to encompass the features of the disclosed grill and could be produced in larger size to accommodate the roasting of larger whole food, such as a pig. In fact, applying an above-disclosed alternative to the current invention, there is no firebox within the grill, and instead a wood or charcoal fire or of other combustible fuel is simply prepared in the space below the cooking grate to maintain preferred cooking temperatures. This allows for a larger cooking surface area if the dimensions of the overall barbecue grill were to remain the same, or for a smaller overall barbecue grill.

Although the embodied grill is designed for use with charcoal and/or wood or other combustible solid fuels, the design is adaptable for use with gas, i.e., having either an all-gas unit or a hybrid unit that could use gas and charcoal and/or wood, or combinations thereof. In an alternative embodiment, gas is used in a gas assist apparatus or gas starter unit in combination with the charcoal, wood or other combustible solid fuels, to create embers for smoking or cooking the food in the cooking enclosure.

Although the current invention is designed as a stand-alone mobile barbecue grill, the same design could be used as a built-in grill, whereby the barbecue grill unit would be inserted or fixed to a wall, outdoor counter, tabletop and/or counter structure as part of an outdoor kitchen. Alternatively, small, portable tabletop size grills are possible, particularly in the design in which the firebox is not within the grill.

Turning to the Figures, certain terminology is used in the following description for convenience only and is not limiting. Directional words used to explain orientation are intended to assume their commonly understood meaning. With regard to the described Figures, as indicated above, the words "right," "left," "top," and "bottom" designate directions used with reference to an embodiment of the invention positioned as shown in FIG. 1 of the accompanying drawings. "Front" and "back" refer to the orientation of the components within the grill as viewed from the position of a user facing the grill, such that the "front" of the grill is proximal to the user and the "back" of the grill is distal to the user. When viewed in that orientation, the curved lid 1 (arcuate in shape) in the "closed position" forms the "front and top of the grill. A horizontal plane described herein for the purposes of rotation of the lid would be left to right or right to left in a direction parallel to the front of the grill. Conversely, the ash pan is at the "bottom" of the grill, and "beneath" the grill are legs with wheels and an accessory tray or shelf, as shown in FIGS. 1 and 2. The words "interior" and "exterior" refer to directions towards and away from, respectively, the geometric center of the grill apparatus or designated parts thereof. The terminology includes the words above specifically mentioned, derivatives thereof and words of similar meaning.

Referring to the drawings, wherein like reference numerals are used to designate the same components throughout the figures, shown in FIGS. 1-19 are presently preferred embodiments of a grilling apparatus having enhanced safety and convenience of operation, or components thereof, but are not intended to so limit the invention.

Grill Assembly

FIG. 1 shows a front perspective view of the invention in an exemplary form as a grill assembly. In at least one embodiment, the arcuate shape of the grill front and the corresponding curved shape of the lid are approximately shaped as a quarter circle or quarter barrel shape when viewed horizontally from either end, having a center axis of the barrel or cylinder shape of the grill at a line extending horizontally from the center point of base plate 23 where it is secured to back panel 24. However, the disclosed assembly may be adapted to other grill constructs, including without limitation, e.g., a pivoting downward moving lid design set forth in Alternative Embodiment 2 below.

Frame Assembly

The frame assembly for the grill apparatus has two matched, but mirror imaged, frames (e.g., the left side and right side as shown, respectively). The frame members of each side are constructed of rectangular or square tubes of preferably steel, although stainless steel, aluminum, titanium or other nonflammable metal or nonmetal structural materials may be used. Each frame member has two ends, a first end, and an opposite or opposing end. Each side provides a construct of curved rectangular tubing frame support member 2, forming the approximate arcuate shape of the grill front. Curved frame support member 2 is secured (e.g., by a permanent weld or releasable fasteners, although not so limited) at a first end to the top of vertical frame support member comprising rectangular tubing 3, such that the curve of curved frame support member 2 bows in an arc away from the top of support member 3 (having the furthest point of the arch of curved support member 2 at the greatest distance from the vertical of vertical support member 3). Then the curvilinear arc of support member 2 continues until it again meets frame support member 3, thus curved support member 2 forms a semicircle with regard to vertical support member 3. As a result, the opposite (bottom) end of curved member 2 is also secured to the lower part of vertical frame support member 3 at a point that is approximately the same distance below the plane of base plate 23 of the grill, as the distance above the base plate 23, where members 2 and 3 are secured at the top. Curved member 2 preferably provides a "track" on each side of the frame over which curved lid 1 rolls or moves. Lid 1 and its operation are described in greater detail below.

Frame component 4 circumscribes a curvilinear shape. In the depicted embodiment, on each of the two sides of the grill apparatus, vertical frame support member 3 is secured at a midpoint (meaning a point at or near the middle of) to the top end of curved frame member 4. See, e.g., FIGS. 6-10. Rectangular tubing frame member 5 connects the front and back of the grill frame together at its base. Single frame member 5 is secured at one end to vertical frame support member 3, thereby connecting to the back of the grill frame. The opposite end of frame member 5 is secured to the opposite end of curved steel frame member 4, thus affixing the front frame to the back frame of one side. See e.g., FIGS. 6-10. In an alternative embodiment, there are two frame members 5 connecting each side of the front frame to the back frame as described.

Figures 7, 8:
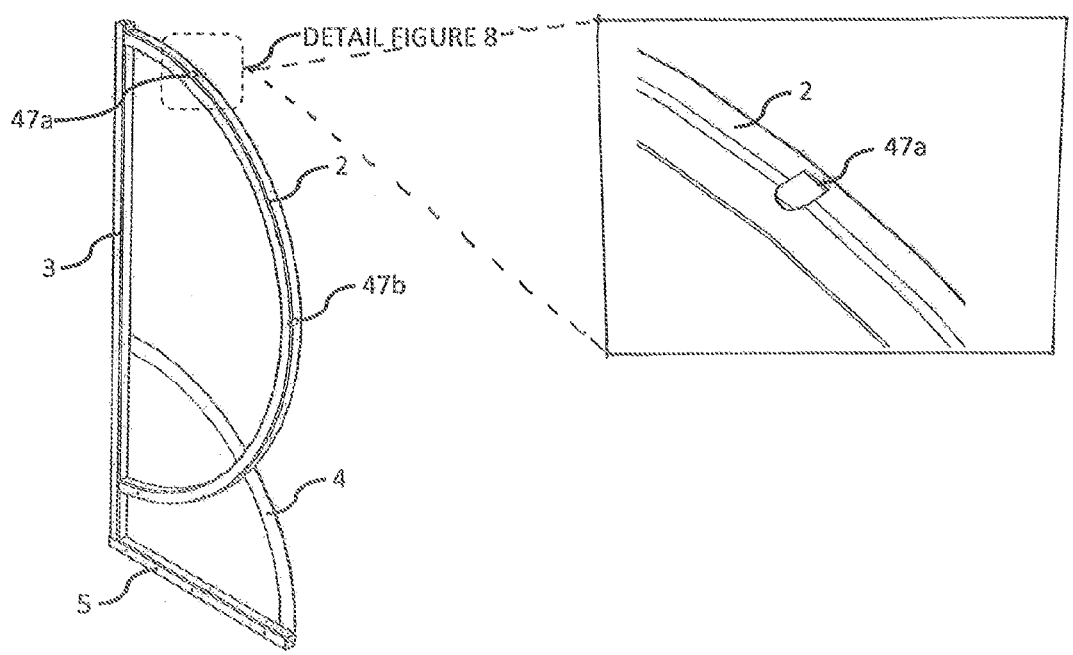
FIG. 7 shows a front perspective view of the right side tubular frame structure of the grill having a roll-down lid.
FIG. 8 shows a close-up view of the curved tube in FIG. 7, showing one of the notches that holds the roll-down lid in a closed position.
Figure 9:
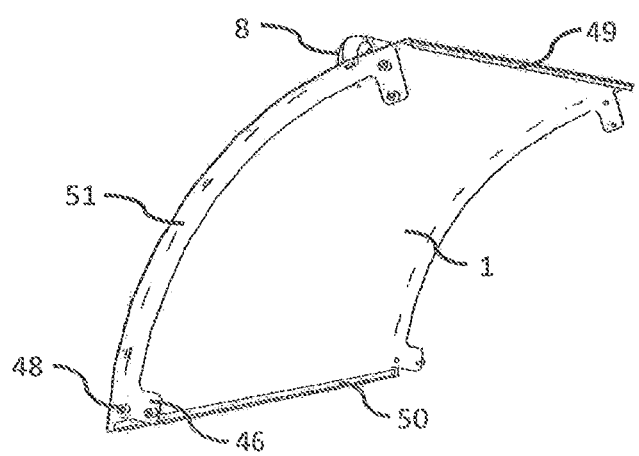
FIG. 9 shows the lid assembly for the roll-down lid.

Completing the respective side frames, as shown at least in FIGS. 2 and 7, side panel 6 is secured along, but below, its curvilinear edge to curved support member 2 (leaving enough space between the top of side panel 6 and the top edge of curved support member 2 to enable front roller 48b to move back and forth), at its back vertical edge to support frame member 3, and at its bottom edge to base plate 23 securing the frame members together into the assembled side frame. The two assembled side frames (combined components 2, 3, 4, 5, and 6, as shown at least in FIGS. 3-4) are connected to each other by fire resistant metal flat rear panel 24 having approximately a flat rectilinear shape that is preferably wider than it is high. However the actual size of the flat rear panel is determined by the size and design of the grill apparatus, which need not be limited to the depicted grill apparatus. As shown at least in FIGS. 2-4, flat rear panel 24 is secured on a vertical plane along the side edge of panel 24 to vertical frame support member 3 on each side; and secured on the bottom edge of panel 24 along a horizontal plane to flat base plate 23.

Further securing the top of curved frame members 2 on each side, and connecting vertical frame support members 3 on each side at the top of the grill is an optional top cover 7. Top cover 7 is a rectilinear curved member, preferably metal or other fire resistant material, which operates as a flange over the open cooking enclosure, enabling curved lid 1 to be of a size slightly smaller than the size otherwise required to cover the entire opening of the cooking enclosure, which would inhibit curved lid 1 from opening all the way under cooking enclosure 71 (for example, see FIG. 2). The front edge of top cover 7 is bent upwards to form flange 73 to enable curved lid 1 to "tuck" underneath top cover 7 when closed, for example to divert rain water from dripping under curved lid and into the cooking enclosure. One long edge of top cover 7 is secured on a horizontal plane to the top edge of flat back panel 24. The opposite long side of top cover 7 extends over cooking enclosure 71 of the grill apparatus and is open and when the cooking enclosure is open. When the cooking enclosure is closed by lid 1, said open long side of top cover 7 meets the top of lid 1, but is not secured to the lid. Each of the two short sides of top cover 7 are secured to side panel 6, without interrupting the track mechanism for moving lid 1 over curved support members 2. In an embodiment wherein top cover 7 is not part of the grill apparatus, it may be replaced by a larger curved lid 1 that covers the entire opening of cooking enclosure 71.

Shelf assembly 22 is secured on each side to horizontal frame support member 5. Thus, the base of the two side frames (as shown in FIG. 6) are connected via shelf assembly 22 to provide enhanced sturdiness and stability to the grill structure. In an alternative embodiment a rod or an additional tube support member could connect horizontal frame support member 5 on either side at the back and front of horizontal support member 5, permitting base shelf assembly 22 to rest thereon and on side support member 5 on each side, making base by shelf assembly 22 removable for easy cleaning or to reduce the weight or bulk of the grill assembly.

Combined support members 2, 3, 4, and 5, together with fire resistant panels 6, 23 and 24, optional shelf assembly 22, optional top cover 7 and lid 1 form the outside frame of the grill apparatus.

Figure 4:
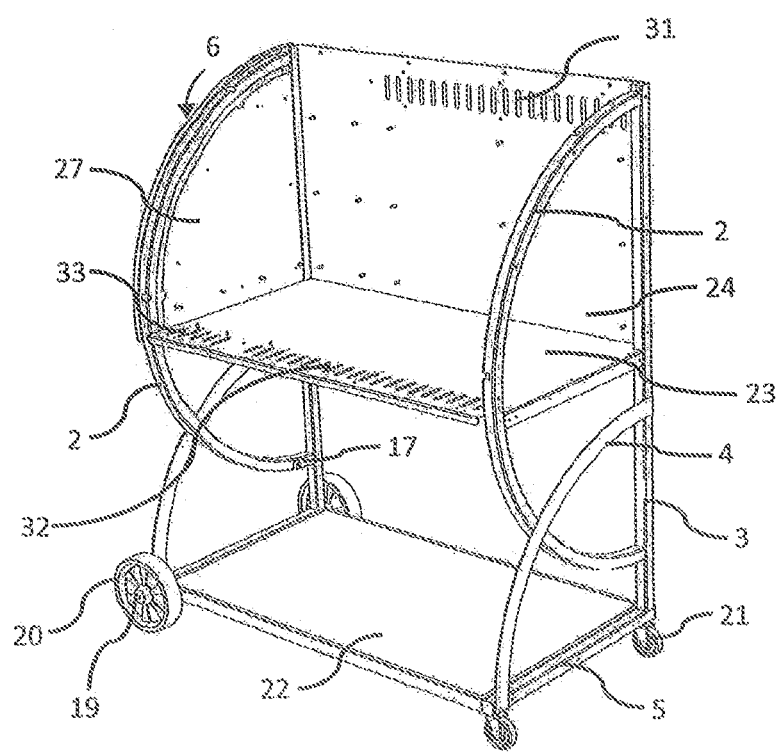
FIG. 4 shows a view of the frame and outer panels of the grill having a roll-down lid.
Figures 10, 11:
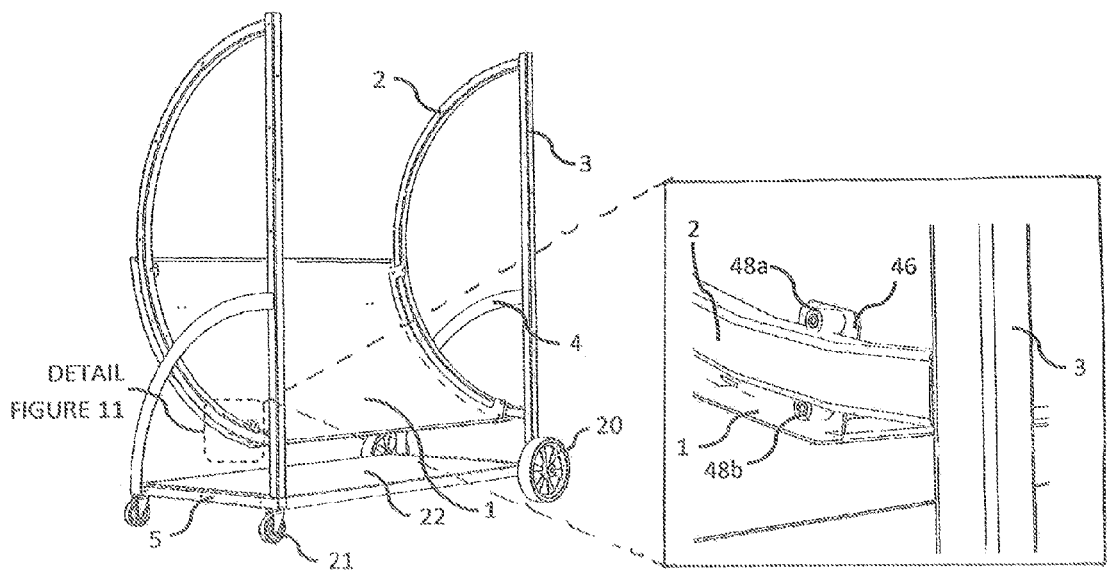
FIG. 10 shows a rear perspective view of the grill assembly having a roll-down lid, but hides all the paneling and components of the cooking enclosure.
FIG. 11 shows a close-up view of the lid's lower roller components from FIG. 10.

The bottom unsecured ends of frame support members 3 and 4 at the bottom of the grill apparatus, below shelf assembly 22 are secured, pads may close the four ends of the open rectangular tube support members, or they may remain open, operating as feet for the grill apparatus. However, in a preferred and depicted embodiment, for example as shown in FIGS. 4 and 10, two large wheels 20 are separated, by the depth of the grill apparatus, and supported by axle 19. Axle 19 preferably goes through frame support member 5, connecting the front of the grill apparatus to the back of the grill apparatus at that plane. On the opposite side of the grill, two small casters 21 are preferably affixed to the bottom of horizontal frame support member 5. Preferably, lockable rotating casters 21 provide easy mobility of the grill apparatus.

This wheel assembly requires that wheels of the same size be on the same horizontal plane, large wheels 20 on one side of the grill assembly, small wheels 21 on the opposite side of the grill assembly, permitting movement of the grill assembly toward one side or the other. In an alternative embodiment both large wheels 20 are on the back of the apparatus (each on the side of horizontal frame support member 5) and both wheels 21 are on the front side of the apparatus (each on the bottom of horizontal frame support member 5), providing front to back movement or the reverse. In yet another embodiment, all wheels are of the same size (see as shown in the alternative, e.g., FIGS. 20 and 21), preferably on casters, providing horizontal mobility of the grill apparatus.

In selected embodiments, back panel 24, base plate 23, top cover 7 and shelf assembly 22 are preferably secured by releasable fasteners to enable low volume packaging.

Figure 2:
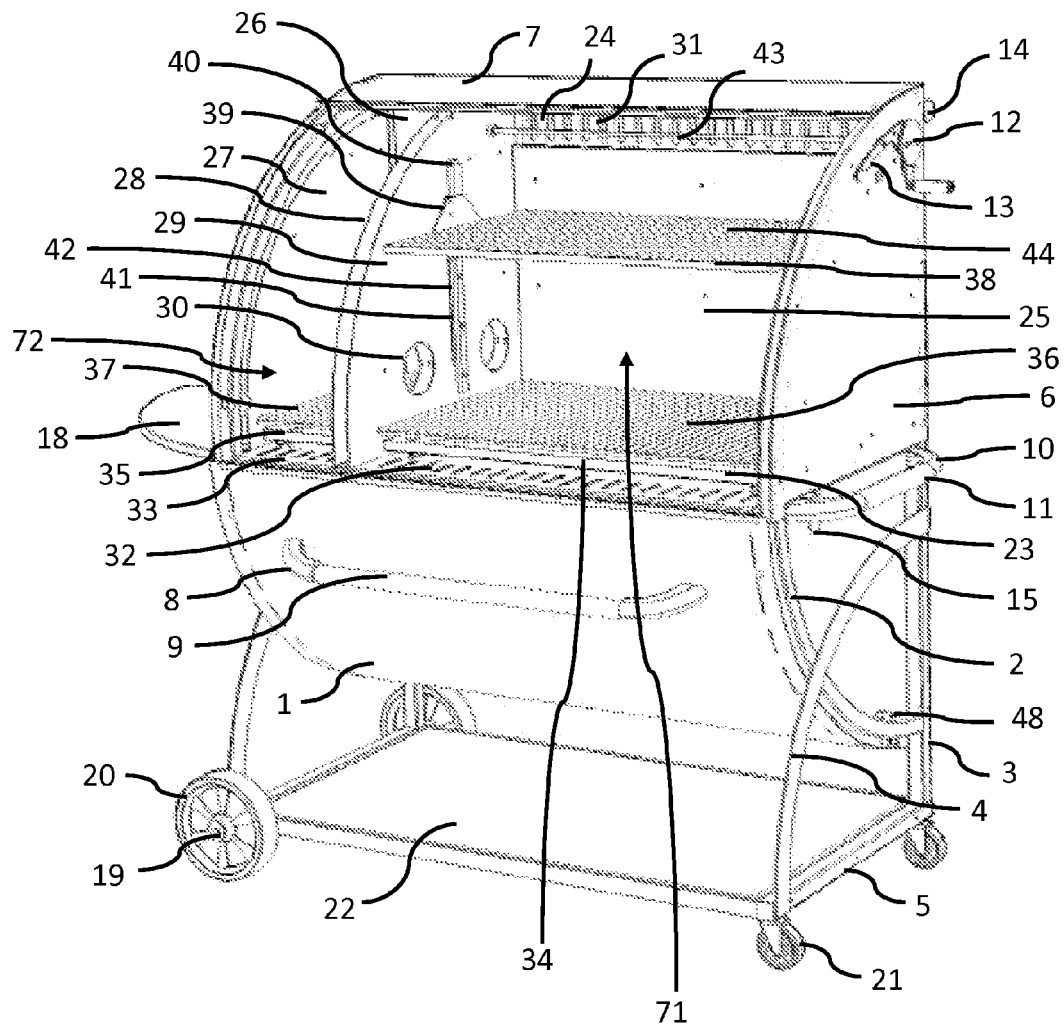
FIG. 2 shows a front perspective view of the grill having a roll-down lid with the lid open.
Figure 3:
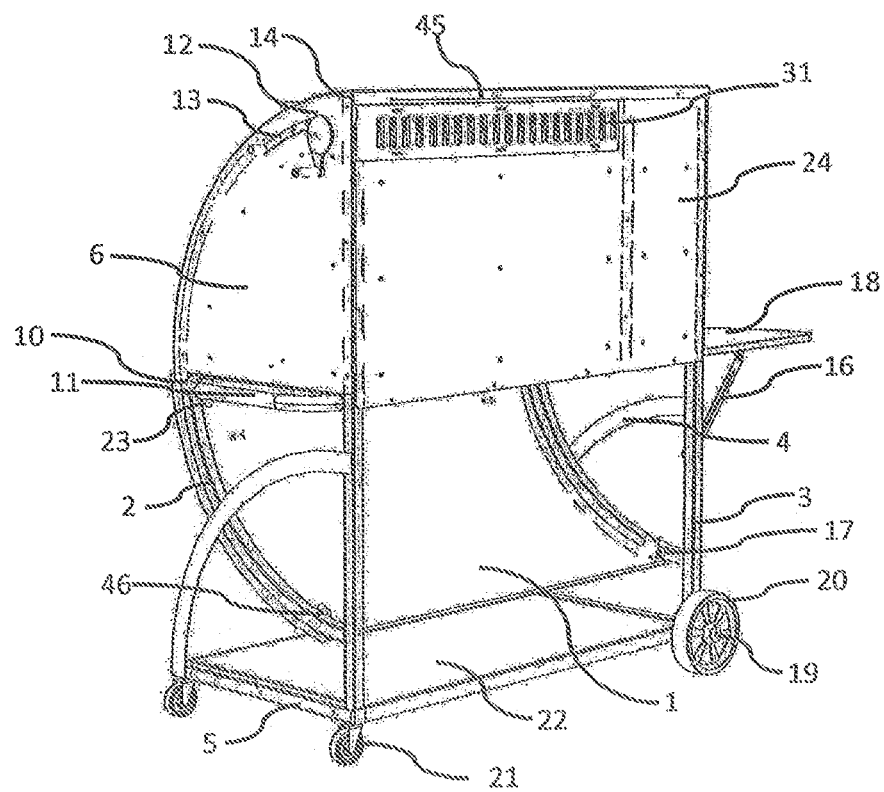
FIG. 3 shows a rear perspective view of the grill having a roll-down lid with the lid open.

In at least one embodiment shown in FIGS. 1-3, the grill apparatus is provided transverse motion by means of an optional, but preferred, grill push handle on one side of the grill assembly, comprising short tube or bar 11 and brackets 10, which secure push handle 11 to base plate 23 with screws or other known mechanical attachment means. On the side of the grill apparatus opposite to push handle 11, is affixed optional side table 18 (shown at least in FIGS. 1-3), supported from the side of base plate 23 by table bracket 16. Side table 18 can be folded down by dislodging table bracket 16 from the pin that holds side table 18 upright in place. Either table 18 and/or bottom shelf 22 can be used for storage.

The Cooking Enclosure and/or Adjacent Firebox

With lid 1 open, the interior of the grill is visible. In the embodiment shown in FIG. 2, the grill interior is divided by a panel into main cooking enclosure 71, where the food is cooked, and firebox 72, where the fire is made using charcoal, wood, or other fuel. In the depicted embodiment firebox 72 and main cooking enclosure 71 are divided by two panels, panel 28 and panel 29, constructed of fire resistant material, and spaced about 1.25 inches apart (although the spacing could range from 0.25 inches to 1.5 inches or more) and protect the mechanism that is used to lower and raise cooking frame 38 from the fire, soot, and/or grease (although in an alternative embodiment only one fire resistant panel could be used since the elements of the lifting mechanism are fire resistant). Although firebox 72 is shown in the Figures as located to the left of main cooking enclosure 71, the left side location is merely exemplary, and the firebox serves exactly the same function if instead it is placed on the right side of main cooking enclosure 71. In fact, in certain embodiments, not only can firebox 72 be located on either side of main cooking enclosure 71, but two fireboxes 72 may be included, wherein one is on each side of main cooking enclosure 71. Conversely, a firebox is not always present in certain embodiments of the claimed grill apparatus.

For the grill apparatus of the present invention to operate the main cooking area must be closable, preferably by the downward moving lid. But in any case, there must be a back wall provided so that the downward opening lid provides closure of the cooking area when re-closed. As a result, main cooking enclosure 71 is provided with large rear interior panel 25 to protect back panel 24 from the heat and flames and improve heat retention within the cooking enclosure. Firebox 72 is provided with small rear interior panel 26 to protect back panel 24 from the heat and flames. See, e.g., FIG. 2.

Main cooking enclosure 71 has removable fire grate 36 that is used to support the charcoal, wood or other solid fuel, and rests on supports secured parallel to base plate 23 on interior wall panel 27 (left side shown in FIG. 2, right side shown in FIG. 15) and right center panel 29. Removable fire grate 36 rests approximately 2 inches (ranging from 0.5 inches to 3 or 4 inches) from base plate 23 to allow air flow to charcoal and/or wood or other combustible fuel.

In embodiments having a firebox, firebox 72 has a removable fire grate 37 that is used to support the charcoal and/or wood fuel or combinations thereof, and rests on supports secured parallel to base plate 23 on interior wall panel 27 and left center panel 28. Removable fire grate 37 rests approximately 2 inches (although the spacing could range from 0.5 inches to 4 or 5 inches or more) above base plate 23 to allow air flow to, e.g., the burning charcoal and/or wood. Large ash pan 34 and small ash pan 35 each rests on base plate 23, beneath respective fire grate 36 and/or fire grate 37 (if present), and are used to collect ash. The ash pans can easily be removed by sliding them out from the front of the cooking enclosure for cleanup.

While not illustrated in the Figures, large ash pan 34 and/or small ash pan 35 are removable. Although in at least one embodiment of the grill apparatus, the ash pans are not present and instead refractory bricks or firebricks rest compactly, directly on base plate 23 in a snug fit without significant spaces. Fire grate 36 and fire grate 37 can be used with the fire grates in place.

In the embodiment depicted in the Figures, cooking frame 38 is a rectangular structure comprising two long steel angle supports (preferably about 30 inches, although dimensions can be longer or shorter depending on the size of the cooking grate supported thereon) and two short steel angle supports (preferably about 18 inches, although dimensions can be longer or shorter depending on the size of the cooking grate supported thereon) welded to the frame. Welded frame 38 supports cooking grate 44, on the support angles. Cooking grate 44 in the current invention is made of parallel steel rods welded to two perpendicular steel rods placed underneath said rods, to form a grate shape known in the art. Cooking grate 44 is also available in different forms and construction materials including, for example, stainless steel, enamel coated steel, cast iron, or the like. Cooking frame 38 is secured to steel plate 39 on either side of the cooking enclosure, which in turn is secured to guide component 40.

Moreover, certain embodiments of the grill provide a partition of single or double wall construction, separating the fire box from the main cooking enclosure with one or more, preferably at least two, circular or other shaped holes or opening(s), to allow heat and smoke to go into and through the cooking enclosure when the grill is used for long term, lower cooking temperature, smoking methods of cooking. In an alternative embodiment, the entire lower section of the partition is open between the firebox and the cooking enclosure, thereby enabling not only smoke to go through to the cooking enclosure, but also enabling embers to be pushed directly from the firebox to the cooking enclosure to facilitate direct heat cooking methods, without the need to shovel the hot embers from the firebox, thus providing additional advantages of this unique grill assembly and apparatus.

The Continuous Loop Controlled, Adjustable Height Cooking Grate and Mechanism

Figure 12:
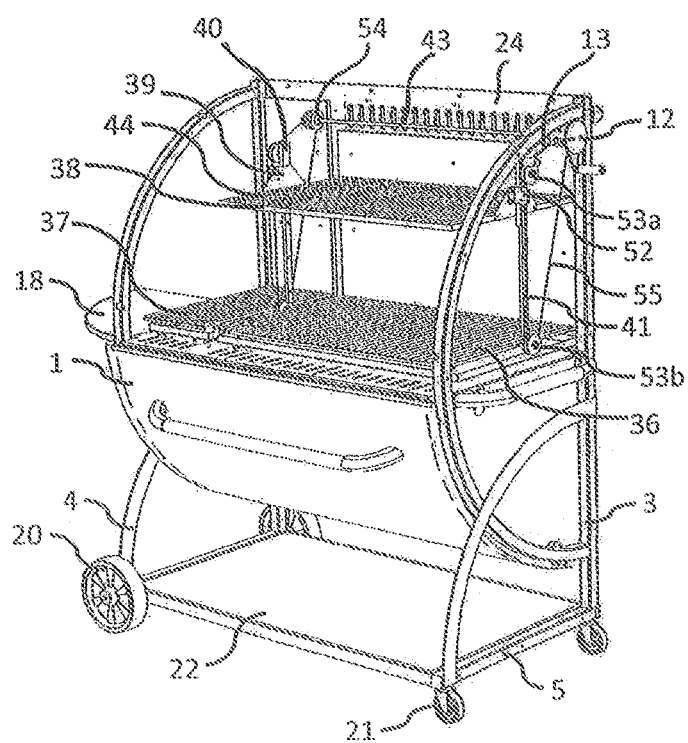
FIG. 12 shows a front perspective view of the grill with the side and inner panels suppressed, and the adjustable height cooking grate mechanism exposed.
Figures 13, 14:
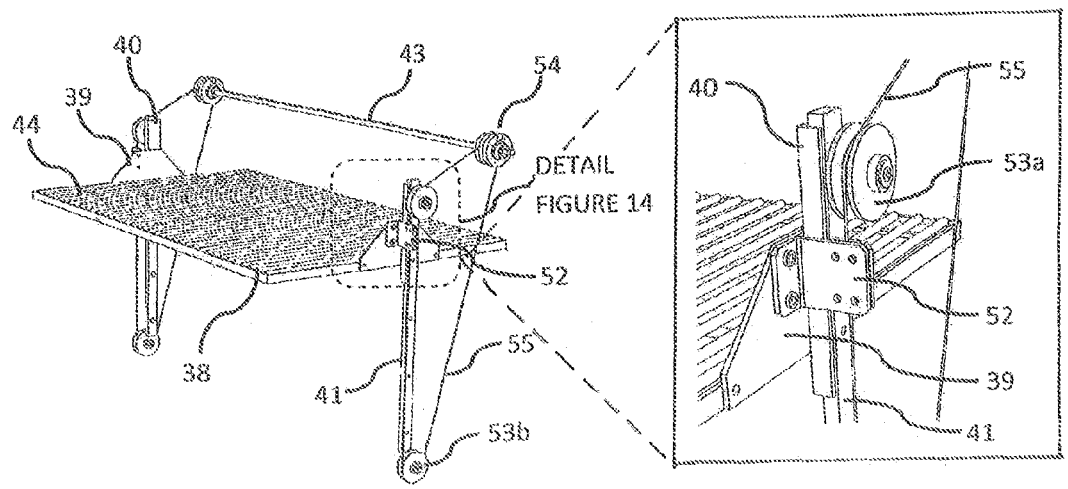
FIG. 13 shows a view of the cooking grate and the adjustable height cooking grate mechanism.
FIG. 14 shows a close-up view of the guide bar, plate and bracket that attaches the cooking grate frame to the cable. The upper center pulley over which the cable rolls is also visible.

The cooking grate lifting mechanism, as illustrated in at least FIGS. 12-14, is preferably provided in combination with the downward opening lid feature, but either feature may be applied independently, and the invention is not so limited as to require both features in combination in every embodiment. The absence of one feature does not preclude the use of the other feature.

Crank shaft 43 for the adjustable height cooking grate is secured to crank 12 and connects crank 12 to the mechanism on the opposite side of the grate, so that both sides of cooking frame 38 lower and rise evenly and simultaneously with the rotation of crank 12. By turning crank 12, the cooking grate inside cooking enclosure 71 is lowered or raised to control the heat reaching the food on the cooking grate. Ratchet arm 13 is affixed (preferably screwed) into side panel 6 with bushing 67 enabling ratchet arm 13 to rotate, extending outward from the side of the frame of the grill apparatus. The end of ratchet arm 13 opposite to the end of handle 66 holds crank 12 in place by locking into pins 63 on crank 12, thereby locking the height of cooking grate 44 in place on each side, so that it does not slip or lower involuntarily.

A front perspective view of the cooking frame 38 assembly, supporting cooking grate 44 is shown in FIG. 12, and details of the adjustable height mechanism are shown in FIGS. 13 and 14. Cooking frame 38 assembly, supporting cooking grate 44 is secured on each of its sides to steel plates 39, which in turn are secured to guide components 40. In an embodiment of the invention, clamp 52 is secured to each steel plate 39, and is used to secure cooking frame 38 assembly, supporting cooking grate 44 to steel cable 55, although this construction need not be so limited to a steel cable, so long as it forms a continuous loop of heat resistant material. Thus, other means of securing cooking frame 38 assembly, supporting cooking grate 44 to a cable or chain may effectively be used. Clamp 52 has two flat metal pieces that are clamped together over cable 55 by means of screws, or other attachment means with enough force to avoid any slippage of cable 55 through clamp 52. Steel cable 55 is secured at each end to capstan 54 (detail shown in FIG. 17), looping around top pulley 53a and bottom pulley 53b to form a complete and continuous loop, allowing both upward and downward pressure on cooking frame 38 (see detail of connection in FIG. 14) to provide parallel movement of both sides of cooking grate 44. This structure minimizes the probability that cooking frame 38 assembly, supporting cooking grate 44 could get stuck when it is lowered, even when uneven weight is applied by the food that is sitting on cooking grate 44.

Guide component 40 is a U-shaped metal component that fits snuggly over guide 41 to minimize the amount of unintended movement of cooking frame 38 assembly, supporting cooking grate 44 as it is lowered and raised. Steel rod 43 connects capstans 54 to each other (shown in FIG. 13) and to crank 12 (shown in FIG. 12; and crank detail in FIGS. 18 and 19), so that turning crank 12 enables the even and simultaneous raising and lowering of both sides of cooking frame 38 assembly, in a parallel manner, supporting cooking grate 44.

The side panel assembly, comprising outside wall panel 6 and parallel interior wall panel 27, and components that comprise the adjustable height mechanism, are shown in FIGS. 15 and 16. Interior wall panel 27 has a slot 42 through which clamp 52 passes (as shown in FIG. 15), connecting cooking frame 38 to steel cable 55. Side panel 6 has a flange 57 along its curved portion to provide rigidity to side panel 6, and to provide a seal when lid 1 is in a closed position causing it to rest on side panel 6. Bushing 56 facilitates the connection of steel rod 43 to capstan 54. FIG. 16 shows the side panel assembly described in FIG. 15, but with interior wall panel 27 hidden. Side panel 6 provides a flange 58 along its lower edge to provide rigidity to side panel 6, and to provide a means of attachment to base plate 23. Standoffs 59 provide a means of securing interior wall panel 27 to side panel 6.

FIG. 17 provides a detailed view of capstan 54 is shown with bushing 56 that provides a connecting means between capstan 54 (see FIG. 16), and steel rod 43 (see FIGS. 12 and 13). Capstan holes 60a and 60b provide a means to secure the extremes of steel cable 55 to capstan 54.

Thus, in the embodied constructions, movement of the continuous loop cable, adjustable mechanism moves over a set of pulleys 53a and 53b, thereby controlling the position of the cooking grate when the affixed rotary crank is turned. The rotary motion of the crank is transmitted by a shaft member to the capstan and pulley assembly, converting rotary motion to vertical lift or motion of cooking frame 38 assembly, supporting cooking grate 44. As indicated pins 63 on the inside of crank 12 provide a locking mechanism, whereby the vertical movement of the cooking frame 38 assembly, supporting cooking grate 44, can be locked in place by allowing ratchet arm 13 to rest on pins 63. The end of ratchet arm 13 that makes contact with pins 63 is applied downward pressure on pins 63 with a spring that is attached to pin 68 on ratchet arm 13 and to pin 68 on side panel 6.

Figure 18:
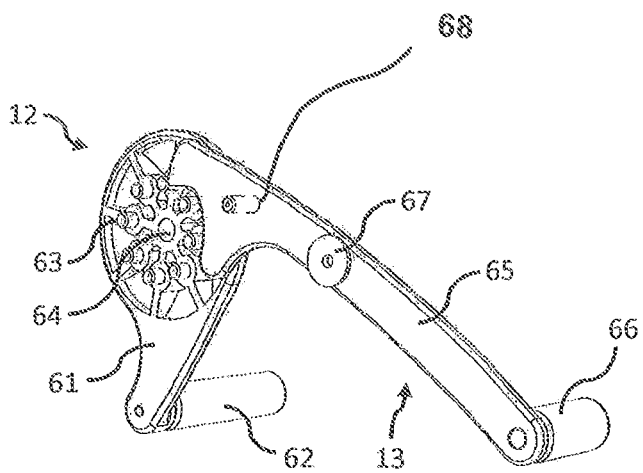
FIG. 18 shows a view of the crank and ratchet arm.
Figure 19:
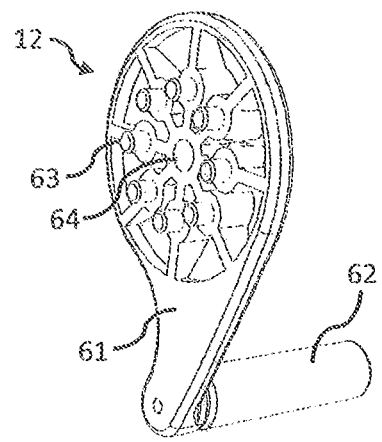
FIG. 19 shows a view of the crank.

FIGS. 18 and 19 provide detailed views of two alternative embodiments, one showing crank 12, and the other showing ratchet arm 13. Crank 12 has a main steel shape 61, pins 63 which allow the end of ratchet arm 13 to engage crank 12 and stop it from turning unless manually disengaged by pushing down on handle 66 (referred to as the "ratchet handle") of ratchet arm 13. The end of ratchet arm 13 that meets pins 63 is shaped in such a way that crank 12 can be turned in one direction without the need to disengage ratchet arm 13, but must be disengaged to turn crank 12 in the opposite direction. Crank hole 64 is where steel rod 43 (shown in FIGS. 12 and 13) connects to crank 12. Ratchet arm bushing 67 enables mobility of ratchet arm 13. See above description regarding transfer of rotary motion of the crank or ratchet into vertical motion of cooking frame 38 assembly, supporting cooking grate 44.

Vents and Smoke Control Mechanisms

Smoke holes 30 allow smoke to circulate from firebox 72 to main cooking enclosure 71 to enable the cooking technique known as smoking, whereby the food cooks with indirect heat and smoke. See, for example, FIG. 2. Different size and shape openings would achieve the same functionality as the illustrated round holes, if the holes were approximately equal to or greater in open area.

Base plate 23 has vent openings 32, shown in FIG. 2, along the front in both main cooking enclosure 71 and firebox 72, and can be adjusted with a damper 45 that is controlled by pulling or pushing on damper tab 15. Back panel 24 has vent openings 31, also shown in FIG. 2, across main cooking enclosure 71 only, not across firebox 72 section, thereby forcing the heat and smoke originating in firebox 72 to pass into and through main cooking enclosure 71 prior to exiting the cooking enclosure. Vent openings 31 can be adjusted with damper 45 by pulling or pushing on damper tab 14. Opening and closing vent openings 32 allows control of the flow of air into main cooking enclosure 71 and firebox 72 when lid 1 is closed. Meanwhile, opening and closing vent openings 31 allows control of the flow of air leaving main cooking enclosure 71.

While not included in the current illustration, an alternative embodiment has four independently functioning vent openings and dampers, two of them located in the lower front section of each of main cooking enclosure 71 and firebox 72, and two of them placed in the upper portion of back panel 24 in each of main cooking enclosure 71 and firebox 72. In an alternative embodiment, vent openings 32 do not exist and are replaced by vent openings at the lower front sections of side panels 6, thereby reducing or preventing ash from falling through onto the inside of lid 1 when lid 1 is opened downward.

Damper 45 is secured to back panel 24 by removable attachment means, such as screws, that are not fully tightened and overlap vent openings 31. See FIG. 3. Damper 45 can be moved in a horizontal direction using tab 14 to partially or completely cover vent openings 31, thereby regulating the heat and smoke, allowing more or less heat and smoke to leave cooking enclosure 71, depending on the selected size of the opening. The openings in damper 45 are placed at an angle to increase the range of the amount of air that enters or leaves cooking enclosure 71.

The Downward Moving "Roll-Down" Lid

Lid 1, shown alone in FIG. 5, is shown in the closed position on the grill apparatus in at least FIG. 1, in the open position on the grill apparatus in at lease FIGS. 2-3.

Lid 1 is preferably curvilinear, but may comprise one or more jointed or bent members operating as a single lid unit. Lid 1 is unique because it is a roll-down apparatus not found on other grills or grills of other designs. Lid 1 provides controlled curvilinear downward rotation about an axis, moving from a closed position to open a cooking enclosure 71 and/or firebox 72 of the grill apparatus. Lid 1 is exemplified as an arcuate construction of essentially a curvilinear rectangular shape, having an exterior surface and a matched interior surface, and four edges. In an alternative design the curvature of the lid is accomplished by connecting at least two pieces at an angle ≥90°, but less than 180°, with joint positioned further away from the grill and the corners of the lid as a whole positioned in the same place as when the lid has a uniform curvature. Instead of two or more jointed pieces, the joint may be replaced by a bend at the same angle as the aforementioned joint, again wherein the corners of the lid are the same as for the exemplified curved lid, and all such designs are encompassed herein. While preferably constructed of a single piece of metal or a dual layer of metal or of other fire resistant material, curved lid 1 may also be accordioned or assembled from a plurality pieces, such as horizontal slats of such material, joined and moving together to form the curved shape of the lid, and is encompassed by this invention, so long as the assembly moves as a single curved unit.

Two opposing parallel edges are curved in an arcuate line forming the curved sides of lid 1 (or straight pieces are bent or joined equating to the curvature of lid 1), perpendicular to which are two opposing parallel linear edges, having a leading edge and a following rear edge, which moves consequent to the leading edge. The leading edge of lid 1 is feature 49 or 50, depending upon the direction of movement of the lid, when moving downward to open the cooking enclosure, the leading edge is the bottom edge of lid 1 as the lid is viewed by a user of the grill (in the closed position the leading edge of lid 1 rests just below base plate 23). The rear edge of the lid consequently follows the leading edge downward. However, when the movement of lid 1 is reversed to re-close the cooking area, the opposite edge (which was the rear edge) is also reversed and becomes the leading edge in the upward closing motion. What had been the leading edge of the lid in the downward movement consequently becomes the following or rear edge in the reversed open movement to re-close the cooking enclosure. As a result, downward movement to open the lid (and of course the reverse upward movement to reclose the lid) translates into rotation of the lid about its axis of rotation, whether lid 1 is actually curved, or whether the lid is joined or bent to equate to the curved lid design—so long as the operation of the lid is as described herein.

The center of curvature of the arcuate lid 1 is perpendicular to a linear plane extending laterally from a center point on the back edge of base plate 23 where it meets with back panel 24 of the grill, such that: a) the lid operably travels on rollers over a curvilinear track comprising curved support frame 2 of the grill, wherein lid 1 duplicates the arcuate shape of curved support frame member 2; b) curved metal support bracket 51 is affixed to the curved edges of lid 1 (shown in FIG. 9), providing rigidity when welded onto both curved edges of lid 1, thereby permitted stable movement of lid 1 without distortion; c) the width of curved metal support bracket 51 extends inward from the curved edges of lid 1 providing an attachment surface for paired rollers 46; d) curved metal support bracket 51 has two ends, each meeting at a corner of an interior curved edge of lid 1, and curved metal support bracket 51 widens at each end, forming bracket 46 (as shown in FIG. 11, there are four brackets 46, each is thus attached to the four corners of the interior curved edges of lid 1). The attachment at the four corners is the same in this embodiment, even if the lid comprises bent or jointed members, rather than a single curve, meaning all are encompassed herein.

Affixed to each bracket 46 is a set of paired rollers 48*a* and 48*b* used to support lid 1 on the track of curved frame support member 2. Back roller 48*a* and front roller 48*b*, shown in place in FIG. 10, and in detail in FIG. 11, showing curved frame support member 2 there between, affix lid 1 onto the grill apparatus in a manner that permits lid 1 to rotate down to open cooking enclosure 71, or to return back up to the closed position curving around the circumference of the curvilinear plane of axis of rotation around base plate 23 of the grill frame. In use, the paired rollers and bracket mechanisms are conceal from view from the exterior of the grill by lid 1. Additional paired rollers 48*a* and 48*b* may be added to additional brackets 46 extending from the interior edge curved metal support bracket 51 in addition to those at the corners of lid 1 to further support lid 1 on the track of curved frame support member 2. While encompassed by the present invention, such additional roller sets are optional.

The top and bottom portions of lid 1 have metal angles 49 and 50 along the entire width of lid 1 to provide a seal for the heat and smoke inside cooking enclosure 71.

In the present embodiment, the downward moving lid 1 can be stopped at selected positions between the closed position shown in FIG. 1 and the fully-opened position shown in FIGS. 2 and 3, so that it is possible to obtain the opening having a desired size (see use of notches described below). For instance, operationally when access is needed to only a small portion of the cooking enclosure 71 or firebox 72, or if a small opening is sufficient, downward moving lid 1 is rotated, the leading edge moving downward, but not rotated into the fully-opened position. Conversely, however, when full access is needed to cooking enclosure 71 and/or firebox 72, it is preferable to move curved lid 1 downward into the fully-opened position. To this end, to fully open the cooking enclosure 71 and/or firebox 72, in the present embodiment, the downward movement of the leading edge of lid 1, necessarily moving on its predefined curvilinear axis of rotation, actually begins its rotation backward under base plate 23 of the grill assembly moving between, but not contacting, right and left side walls 11*b* and 11*c*, until reaching vertical frame support member 3 at the back of the grill, but for bumper 17 on curved frame member 2 at a point adjacent to vertical frame support member 3 that stops the downward leading edge of lid 1 from opening beyond the desired point. See, e.g., FIGS. 3-5. Lid 1 consequently follows the leading edge. From the back perspective of the grill assembly as shown in FIG. 3, with lid 1 fully open, bumpers 17 are shown on each side, on the track of curved frame member 2, thereby stopping lid 1 from continuing to open downward and backward beyond the fixed end-point position of the open lid.

Operationally, when open lid 1 is closed, it is pulled upward, in the reverse rotation from when it was opened downward, until reaching the fully closed position, or at a selected notch position point there between. Embodiments of downward moving lid 1 can alternatively be adapted for existing grill styles. This embodiment also provides advantages over the prior art push up and back lid designs for a variety of reasons, including that opening and closing movements do not require reaching across the entire cooking enclosure and/or firebox opening, thus reducing the possibility of accidentally dropping contaminants on the food on the cooking grate or burns to the user. The functionality of curved lid 1 moving along the track formed by curved support frame member 2 is shown in the rear perspective view of the grill assembly of FIG. 10.

Handle 9 facilitates a user's ability to grasp and rotate the lid. The lid handle comprises a long tube member 9 affixed to brackets 8, which is secured to the exterior surface of lid 1 at a point near the top edge of lid 1 in the closed position. Handle 9 thus extends perpendicularly from the outer surface of lid 1, permitting the user to push the handle on lid 1 downward to open the grill assembly, or to pull the handle upward to close open lid 1. Although lid 1 is constructed of heat resistant material(s), it can still become hot, like any closed oven. As a result, handle 9 is used to open and close lid 1, without directly touching the surface of lid 1. In addition, handle 9 permits lid 1 to be closed over the open cooking enclosure 71 and/or firebox 72, even when hot, because when holding handle 9, the user's hand or arm is always behind the downward opening or re-closing lid 1 (even in the reverse closure movement), and therefore is never exposed to the direct heat. Bracket 8 is secured to lid 1, and to handle 9, preferably with screws to allow for compact packaging, although alternative known means of connection are encompassed by this invention.

Notches 47a and 47b (shown in FIG. 7; detail of notch 47a is provided in FIG. 8) are used to engage rollers 48 (shown in FIG. 11) and hold lid 1 in either a closed position (if engaged in notch 47a) or a selected semi closed position (if engaged in notch 47b). Notch 47a marks the extent of closure provided by curved lid 1 prior to downward opening rotation, and the end point of closing rotation back to the start position, preventing the rollers 46 on the lid from rolling off of the track on curved frame support member 2. Two notches 47a and 47b are shown for holding the lid at a selected position, but optionally one or more additional notches using the same principle may be added along the path of lid 1 to hold the lid at additional selected positions if elected. Of course, the notch does not stop lid 1 from moving beyond its maximum open or maximum closed position. Top cover 7 and base plate 23, together with angle 50 on lid 1 accomplish that function. Notches, e.g., 47a or 47b are purely used to engage the rollers and prevent the lid from rolling back down unexpectedly. The notch also effectively enables the seal between the lid and the side panel as the lid drops into place.

At no point does lid 1 ever roll behind back panel 24 of the grill apparatus; not from the top and behind, and not from the bottom and behind. No movement of lid 1 ever passes beyond rear vertical support frame member 3, readily distinguishing the present invention from the prior art.

Alternative Grill Assembly Having a Downward Moving Pivoting Down Lid

Figure 20:
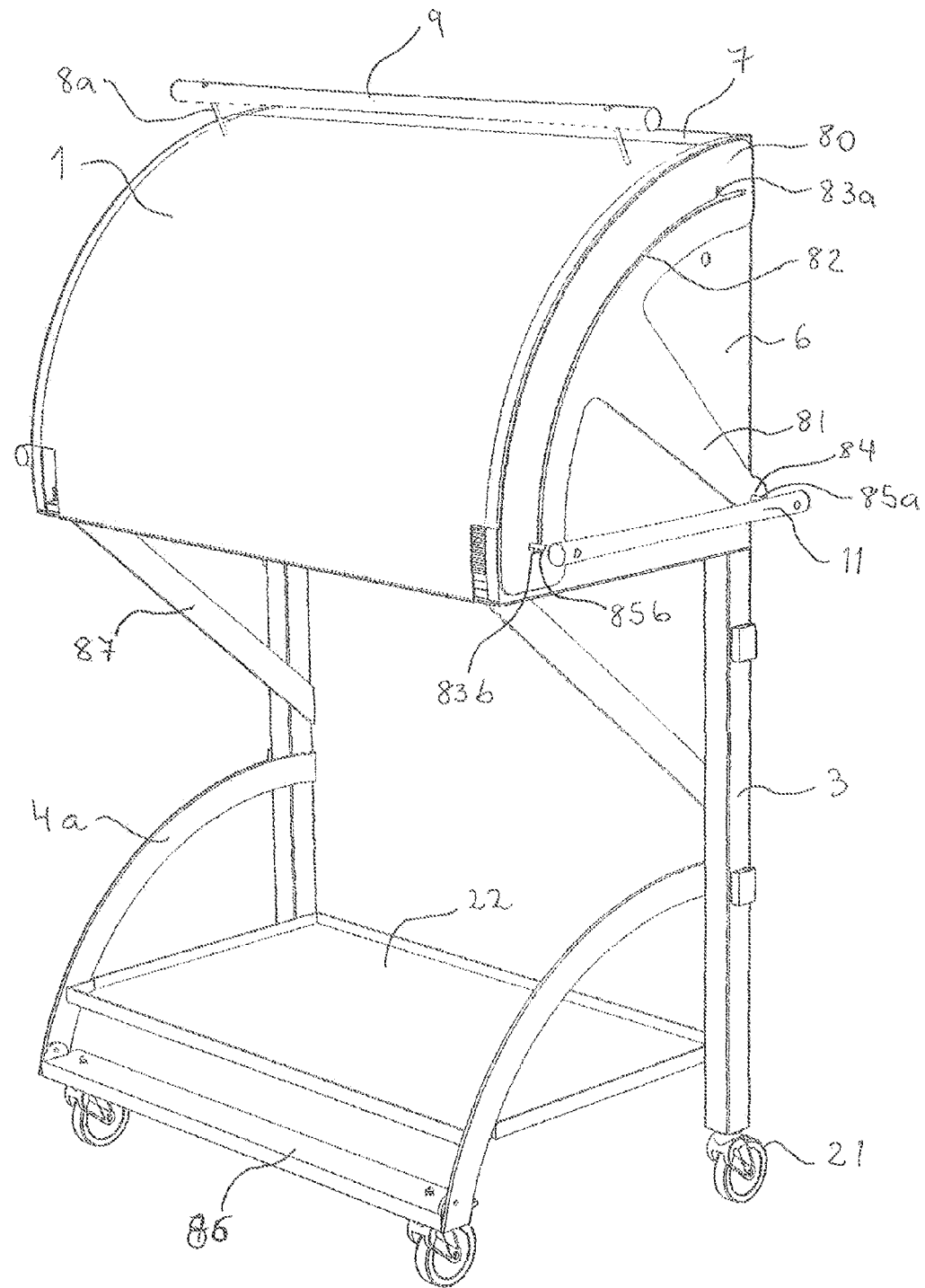
FIG. 20 shows a front perspective view of the grill having a downward pivoting lid with the lid closed.
Figure 21:
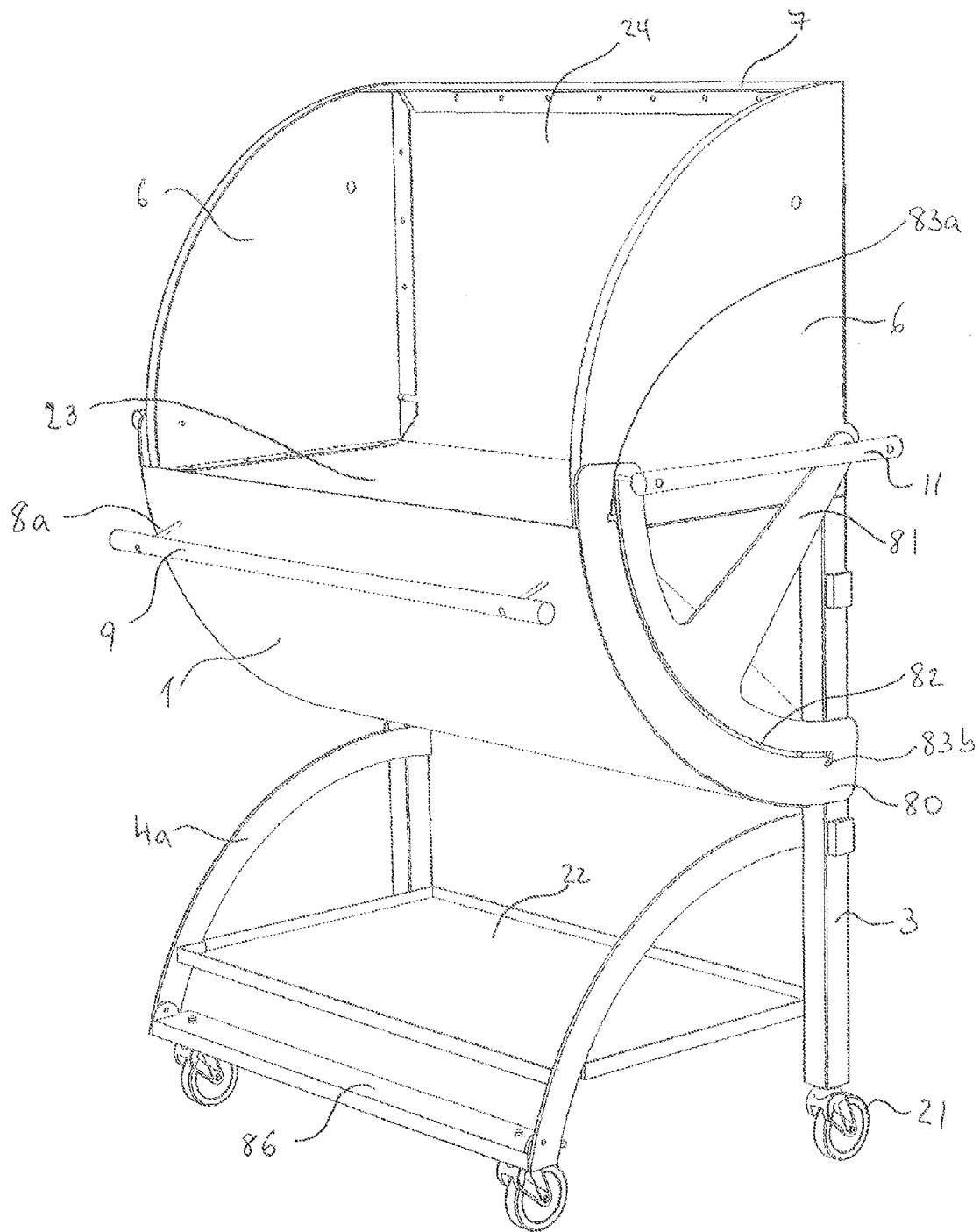
FIG. 21 shows a front perspective view of the grill having a downward pivoting lid with the lid open, showing the pivoting mechanism and the inside of the cooking enclosure, but with only the outer structural panels shown.

The grill apparatus of the present invention encompasses any design or alternative comprising the unique downward moving lid, particularly a downward moving curved lid assembly. Preferably, but not always, such encompassed designs further comprise the adjustable height cooking grate controlled by a continuous loop mechanism. In a second embodiment, the invention encompasses use of the downward moving lid operating in an alternative pivoting downward curved lid design, or in the alternative at least one bent or joined members operating in a like manner. FIGS. 20 and 21 are provided to show the elements of such an alternative design that achieves the same downward motion in a curved grill lid as the "roll-down lid" that allows the lid to rotate to an open position resting under the cooking enclosure. Features shown in FIGS. 20 and 21 that are essentially the same as in FIGS. 1-19 are given the same reference numbers throughout the drawings, whereas features of the alternative pivot mechanism are given new reference numbers that are parallel to, but different from those of FIGS. 1-19.

FIG. 20 shows a front perspective view of the exemplary grill assembly having a downward pivoting curved lid 1. In this alternative embodiment, the arcuate shape of the grill front and the corresponding curved shape of the lid are, as in the first embodied roll-down grill apparatus, approximately shaped as a quarter cylinder or quarter barrel shape when viewed horizontally from either end, having a center axis of the barrel or cylinder shape of the grill at approximately a line extending horizontally when viewed from the front of the grill, from the center point of base plate 23 near to where it is secured to back panel 24. FIG. 20 shows the detailed alternative embodiment, with exemplified arcuate lid 1 in the fully closed position, wherein a pivoting lid mechanism operates lid 1, in an alternative to a rolling or sliding lid mechanism, providing evidence that the present invention encompasses all such downward moving curved lids on a grill, regardless of the mechanism of operation, and regardless of the presence of other features embodied herein.

As shown in FIGS. 20 and 21, lid 1 operated by a pivoting mechanism no longer requires curved frame support member 2 of the first "roll-down" embodiment (although curved frame support member 2 could still exist in the current embodiment, so long as it does not interfere with the opening and closing of lid 1), instead lid 1 is supported from the outside on each side of lid 1 by slotted plate 80 having one curvilinear edge that on the side of the plate nearest to the opening of the cooking enclosure on one side of the grill and/or the firebox, if present, on the other side of the grill, duplicates the curved edge of arcuate lid 1. The two slotted plates 80, one on each side 6 of the grill frame, are respectively secured along the opposing sides of the curved edge of lid 1. Slotted plate 80 has a flat surface parallel to, but not immovably affixed to side 6 of the grill frame, but the edge of slotted plate 80 secures to lid 1 along each of the side edges. Extending from the side of slotted plate 80 opposite and distal to the curved edge, is a flat, extension, affixed parallel to the side of the grill frame, is pivot arm 81. Pivot arm 81 extends backward, away from the front of the grill, towards the lower back corner, on the outside of the grill's side frame 6, toward vertical support member 3 and toward where base plate 23 meets back panel 24 of the cooking enclosure in a direction that is perpendicular to the curved edge of slotted plate 80. The end of pivot arm 81 provides center opening 84 that enables bracket 85a to go through pivot arm 81. After passing through pivot arm 81, bracket 85a is affixed to side panel 6, e.g., by screwing or other known means, limiting movement of pivot arm 81 to essentially a circular motion around a center point at bracket 85a. Thus, pivot arm 81 and slotted plate 80 essentially act as a radius of a circle creating a rotary swing arm, having its center at bracket 85a, enabling lid 1 to operably rotate downward to an end point below base plate 23 of the cooking enclosure when open, or upward to re-close the cooking enclosure, having an opposing end point in the fully closed position. Consequently, although operating on a different mechanism, the pivoting lid of this embodiment moves over the same rotation as the rolling lid of the first embodiment.

Slotted plate 80 is circumscribed by curved slot 82 which follows and duplicates the curvature of the curved edge, passing equidistantly for the length of and through slotted plate 80, albeit the slot does not penetrate the ends of slotted plate 80, each of which remains closed at both ends. Bracket 85b extends outwardly from and passes perpendicularly through curved slot 82. Bracket 85b remains fixed, whereas curved slot moves forward over bracket 85b when opening lid 1, and in the reverse position when closing lid 1.

Proximate to each end of curved slot 82 in slotted plate 80 are notches 83a at the top end and 83b at the bottom end of the slot. This is repeated on each side panel 6. When notch 83a in slot 82 slips into bracket 85b, lid 1 is locked into the fully open position. When notch 83b in slot 82 slips into bracket 85b, lid 1 is locked into the fully closed position. Optionally one or more additional notches may be placed along slot 82 between notches 83a and 83b, operating in the same way, but locking lid 1 into an equal number of one or more partially opened or partially closed positions. Consequently, notches 83a and 83b play essentially the same role on the pivoting down lid 1 of this embodiment, as notches 47a and 47b do in the previously described roll-down lid 1 of the first embodiment of the grill apparatus.

Although not shown in the current Figures, pivot arm 81 could in the alternative be secured at opening 84 (seen on FIG. 20 at the center of the arc of rotation of lid 1) to a spring mechanism that would facilitate the opening and closing of lid 1 by the user. Operation of such springs to assist lifting of lids is known in the art.

As shown in FIG. 20 a straight frame support member 87 on both side frames 6 of the grill (partially hidden by fully open lid 1 in FIG. 21), act as a structural support for the front of cooking enclosure 71, which would otherwise have no support across the front edge, given that vertical support legs along the front of the cooking enclosure are not possible since they would impede the downward pivoting movement of lid 1. Straight frame support member 87 connects the front of base plate 23 to a midpoint of vertical frame support member 3, above the point where curved support member 4a joins vertical frame support member 3. In fact, in this embodiment with the downward pivoting lid, straight frame support member 87 effectively replaces the section of curved support member 2 that rests under the base plate of the first embodied roll-down lid grill. Of course, as mentioned, curved frame support member 2 of the roll-down lid grill may still be used in this downward pivoting lid embodiment, if desired, to provide greater structural integrity to the grill, in which alternative embodiment, curved frame support member 2 replaces straight arm 87.

Curved frame support member 4 in the first embodiment of the grill, having a roll-down lid, is replaced in the present embodiment, operating by a downward-pivoting lid embodiment, by smaller curved frame support member 4a, connecting vertical frame support member 3 at the rear of the frame to horizontal frame base member 86. However, one skilled in the art would realize that curved support member 4 of the first embodiment would have to be reduced in size to avoid obstructing the swing of the pivot mechanism in the present embodiment. As a result, because curved frame support member 4a is smaller, it joins vertical frame support member 3 at a point that is closer to the lower end of vertical frame support member 3 than in the first embodiment to avoid interfering with slotted plate 80 and pivot arm 81 as lid 1 is opened downward and pivoted under the cooking enclosure.

In addition, the base of the grill as shown in FIGS. 20 and 21 is slightly altered from the first embodiment. Horizontal support member 5 of the first embodiment is suppressed on either side of the grill in the present embodiment, and shelf assembly 22 is secured to the two vertical frame support members 3 on either side 6 of the grill of the present embodiment and to curved frame support member 4a. Horizontal support member 86 is secured to the lower end of each of curved frame support members 4a to provide additional structural integrity. Note that only small wheels 21 are shown in the present embodiment depicted in FIGS. 20 and 21, with rear small wheels 21 secured to the bottom of vertical frame support member 3 at the rear of the grill and to horizontal frame support 87 at the front of the grill. As discussed above the wheel arrangement is optional, and while shown differently in the depicted embodiments of the grill apparatus, the base of the grill could remain exactly the same as in the first embodiment.

Push handle 11 in the present embodiment is secured to panel 6 by means of brackets 85a and 85b, affixed by any known method, such as a screw or other means, to panel 6, and also functions as a guide and containment for slot 82 as lid 1 opens and closes.

Shelf assembly 18 may be omitted in the present embodiment or modified to accommodate the rotational movement of pivot arm 81, although not depicted in FIG. 20 or 21. An alternative is not shown. All other elements could essentially be the same as in the first embodiment.

Accordingly, the remaining features and elements of the second embodiment of the grill shown in FIGS. 20 and 21, and in all alternative embodiments, remain essentially the same as shown in the first embodiment of the grill apparatus, shown in FIGS. 1-19, and may be replicated herein, even though the second embodiment comprises a downward pivoting curved lid and pivot mechanism. As a result the benefits and advantages of the downward moving curved lid invention are provided by any grill apparatus of any size on which the downward moving lid principle is applied or adapted, regardless of the type of mechanism used to effect the downward movement of the lid to open the cooking enclosure.

In sum, advantages of the presently disclosed cooking apparatus include, but are not limited to 1) the unique shape and construction of the disclosed grill, including the cooking versatility, safety and ease of operation substantially provided by downward opening curved lid 1, which opens both the front and top of the grill for operation and reverses to an upward movement to reclose the cooking enclosure; 2) the side firebox for charcoal, wood, or other combustible fuels, which can effectively offer a base of firebricks, and which in certain embodiments is designed to provide an available source of hot embers or coal so that the grill is useful for either cooking or smoking the food, and 3) the adjustable cooking grates using a locking crank mechanism to offer cooking temperature control and secure food handling in the grill. In addition, the grill advantageously improves over prior art grills by providing separately or in combination another advantage—the "closed loop cable mechanism" to evenly and simultaneously adjust the height of each side of the cooking grate. This is because in contrast to prior art adjustable height cooking grates, that "hang" from cables, chains or the like within the grill, and use the force of gravity when the cooking grate is lowered, the currently disclosed grill assembly utilizes a closed loop of steel wire or cable that enables the user to apply controlled downward force on the cooking grate. As a result of this improvement, the probability that the cooking grate will get stuck on the guides when lowered is reduced and minimized.

The disclosure of each patent, patent application and publication cited or described in this document is hereby incorporated herein by reference, in its entirety.

While the foregoing specification has been described with regard to certain preferred embodiments, and many details have been set forth for the purpose of illustration, it will be apparent to those skilled in the art without departing from the spirit and scope of the invention, that the invention may be subject to various modifications and additional embodiments, and that certain of the details described herein can be varied considerably without departing from the basic principles of the invention. Such modifications and additional embodiments are also intended to fall within the scope of the appended claims.

I claim:

1. A grill comprising downwardly opening lid system affixed to the grill for cooking food, providing controlled downward movement following a curved frame support or side panel of the grill, said construction permits the lid to reversibly move under a cooking enclosure of the grill, from a closed position to open the cooking enclosure of the grill apparatus, the lid system comprising a solid, fire resistant lid having
   a curved exterior surface,
   an interior surface parallel to and aligned with the curved exterior surface, and four edges,
- two opposing curvilinear edges, forming the sides of the lid, perpendicular to which are two opposing straight edges, providing a leading edge and a rear edge which moves consequent to the leading edge;

an axis of rotation of the downward opening lid, wherein said rotation of the lid centers linearly on a base plate of the cooking enclosure proximate to where the base plate meets a back panel of the cooking enclosure, such that:

a) downward opening movement of the lid slidingly follows the curved frame support or side panel of the grill, to a position under the cooking enclosure of the grill, to open the cooking enclosure, said lid extending beneath the base plate, as controlled by end-point and motion limiting features on frame members, to determine size of a resulting opening to the cooking enclosure; and b) rotational direction of the lid following the curved frame support or side panel of the grill apparatus reverses upward from an open position to close the cooking enclosure.

2. The grill of claim 1, wherein the lid travels on rollers over a curvilinear track support frame member duplicating the shape of the curved frame support or side panel of the grill apparatus, causing the lid to rotate downward to open the cooking enclosure of the grill apparatus.

3. The grill of claim 1, wherein the lid pivots on a pivot mechanism duplicating the shape of the curved frame support or side panel of the grill apparatus, the pivot mechanism causing the lid to pivot downward in a curvilinear rotational motion to open the cooking enclosure of the grill apparatus.

\* \* \* \* \*